(12) United States Patent
Gangal et al.

(10) Patent No.: US 12,292,890 B2
(45) Date of Patent: May 6, 2025

(54) SYSTEM AND METHODS FOR DATA VISUALIZATION PROGRAM

(71) Applicant: Kushmanda Tech LLC, San Diego, CA (US)

(72) Inventors: Amaresh Gangal, San Diego, CA (US); Yogesh Narayan Parihar, Madhya Pradesh (IN); Yash Kishor Varia, Maharashtra (IN)

(73) Assignee: Kushmanda Tech LLC, San Diego, CA (US)

( * ) Notice: Subject to any disclaimer, the term of this patent is extended or adjusted under 35 U.S.C. 154(b) by 0 days.

(21) Appl. No.: 18/478,434

(22) Filed: Sep. 29, 2023

(65) Prior Publication Data
US 2025/0110959 A1 Apr. 3, 2025

(51) Int. Cl.
*G06F 16/2455* (2019.01)
*G06F 16/215* (2019.01)

(52) U.S. Cl.
CPC ........ *G06F 16/2456* (2019.01); *G06F 16/215* (2019.01)

(58) Field of Classification Search
CPC .. G06F 16/2456; G06F 16/215; G06F 16/248; G06F 16/285; G06F 16/9038

USPC ................ 707/714, 722, 736, 737, 738, 769
See application file for complete search history.

(56) References Cited

U.S. PATENT DOCUMENTS

| | | | |
|---|---|---|---|
| 11,030,552 B1 * | 6/2021 | Gustafsson | G06Q 10/063 |
| 2018/0203920 A1 * | 7/2018 | Chen | G06F 16/2465 |
| 2019/0317732 A1 * | 10/2019 | Xu | G06F 7/57 |
| 2020/0342290 A1 * | 10/2020 | Carothers | G06N 3/063 |
| 2023/0073312 A1 * | 3/2023 | Portisch | G06F 16/258 |

* cited by examiner

*Primary Examiner* — Phong H Nguyen
(74) *Attorney, Agent, or Firm* — Knobbe, Martens, Olson & Bear, LLP

(57) ABSTRACT

A system for processing an image in multiple dimensions of data for use on a two-dimensional form factor user interface is proposed. A system imports data inputs. A system determines the data inputs include at least one subject column and at least three parameter columns. A system determines first and second data inputs include a common key. A system joins the first and second data inputs and determines missing values. A system generates fill values for each missing value. A system categorizes each column the data inputs into subject columns and parameter columns. A system categorizes the first column into a parameter type. A system receives user inputs selecting at least one subject column and at least three parameter columns to be assigned to plot dimensions. A system determines positions associated with each data point based on the subject column and the three parameter columns.

21 Claims, 11 Drawing Sheets

SYSTEM AND METHODS FOR DATA VISUALIZATION PROGRAM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The described technology generally relates to data processing, and more particularly, to systems and methods for data visualization.

Description of Related Technology

Analytics has become a part of the modern world consumers and businesses. For example, analytics can be used when researching, purchasing, or otherwise analyzing information, such as homes purchases, rentals, hotels for vacation, etc.

SUMMARY

The systems, methods, and devices of this disclosure each have several innovative aspects, no single one of which is solely responsible for all of the desirable attributes disclosed herein. Without limiting the scope of the appended claims, some prominent features are described herein.

In some aspects, the techniques described herein relate to a computer-implemented method for processing an image in multiple dimensions of data for use on a two-dimensional form factor user interface. The computer-implemented method can include importing, at a processor, one or more data inputs from one or more databases. The computer-implemented method can include determining, at the processor, that the one or more data inputs include at least one subject column and at least three parameter columns. The computer-implemented method can include determining, at the processor, whether a first data input and a second data input of the one or more data inputs include a common key. The computer-implemented method can include, in response to determining the first data input and the second data input include the common key, joining, at the processor, the first data input and the second data input. The computer-implemented method can include determining, at the processor, whether one or more values of the one or more data inputs are missing. The computer-implemented method can include, in response to determining the one or more values are missing, generating, at the processor, fill values for each missing value; categorizing, at the processor, each column of the one or more data inputs into subject columns and parameter columns. The computer-implemented method can include, in response to categorizing a first column into a parameter column, categorizing, at the processor, the first column into a parameter type. The computer-implemented method can include receiving, at the processor, one or more user inputs configured to select at least one subject column and at least three parameter columns to be assigned to at least three plot dimensions. The computer-implemented method can include determining, at the processor, positions associated with each of a plurality of data points based at least in part on the one subject column and the three parameter columns. The computer-implemented method can include determining, at the processor, one or more additional dimensional attributes for each data point of the plurality of data points based at least in part on additional selected parameter columns. The computer-implemented method can include, in response to determining the plurality of data point positions and determining one or more additional dimensional attributes for each data point, determining, at the processor, whether the plurality of data points overlap each other in more than a threshold amount along at least a first plot dimension of the at least three plot dimensions. The computer-implemented method can include adjusting, at the processor, a length of at least the first plot dimension and redetermining, at the processor, the plurality of positions. The computer-implemented method can include determining, at the processor, one or more reference indicators based at least in part on the plurality of positions. The computer-implemented method can include displaying, at the processor, each data point of the plurality of data points on a graphical user interface based at least in part on the plurality of positions, the one or more additional dimensional attributes, and the one or more reference indicators.

In some embodiments, the common key includes a common subject, and determining whether the first data input and the second data input include the common key can include determining whether the first data input and the second data input each include a column of data associated with the common subject.

In some embodiments, joining the first data input and the second data input includes performing structured query language join statements between the first data input and the second data input.

In some embodiments, determining whether the one or more values are missing includes determining whether a first column does not have a data value that corresponds to a subject value of the at least one subject column.

In some embodiments, generating the fill values for each missing value includes at least one of: entering a default value into each missing value, entering a median value of a column of data associated with each missing value, or entering an average value of the column of data associated with each missing value.

In some embodiments, the subject columns include data values identifying the plurality of data points, and the parameter columns include data values associated with the position associated with each of the plurality of data points and the one or more additional dimensional attributes for each data point.

In some embodiments, categorizing the first column into the parameter type includes determining that the first column includes one of ordinal data, nominal data, discrete data, continuous data, date data, or snapshot data.

In some embodiments, the computer-implemented method can include determining, at the processor, one or more relative axis dimensions based at least in part on one or more determined parameter types. Each of the relative axis dimensions can include a range of values and outlier defining values. The outlier defining values identify one or more outlier values from the range of values.

In some embodiments, the one or more additional dimensional attributes include at least one of a ball size dimension, a ball color dimension, a ball shape dimensions, an additional symbol dimension, or a time dimensions.

In some embodiments, determining whether the plurality of data points overlap each other in more than a threshold amount along at least a first plot dimension of the at least three plot dimensions includes determining a number of data point overlaps, wherein a data point overlap includes two data points that intersect on at least the first plot dimension, and determining the number of data point overlaps exceeds the threshold amount.

In some aspects, the techniques described herein relate to a system for processing an image in multiple dimensions of data for use on a two-dimensional form factor user interface. The system can include one or more processors; and one or more non-transitory computer-readable media storing instructions which, when executed by the one or more processors, cause the one or more processors to: import one or more data inputs from one or more databases; determine that the one or more data inputs include at least one subject column and at least three parameter columns; determine whether a first data input and a second data input of the one or more data inputs include a common key; in response to determining the first data input and the second data input include the common key, join the first data input and the second data input; determine whether one or more values of the one or more data inputs are missing; in response to determining the one or more values are missing, generate fill values for each missing value; categorize each column of the one or more data inputs into subject columns and parameter columns; in response to categorizing a first column into a parameter column, categorize the first column into a parameter type; receive one or more user inputs configured to select at least one subject column and at least three parameter columns to be assigned to at least three plot dimensions; determine positions associated with each of a plurality of data points based at least in part on the one subject column and the three parameter columns; determine one or more additional dimensional attributes for each data point of the plurality of data points based at least in part on additional selected parameter columns; in response to determining the plurality of data point positions and determining one or more additional dimensional attributes for each data point, determine whether the plurality of data points overlap each other in more than a threshold amount along at least a first plot dimension of the at least three plot dimensions; adjust a length of at least the first plot dimension and redetermine the plurality of positions; determine one or more reference indicators based at least in part on the plurality of positions; and display each data point of the plurality of data points on a graphical user interface based at least in part on the plurality of positions, the one or more additional dimensional attributes, and the one or more reference indicators.

In some embodiments, the common key includes a common subject, and wherein to determine whether the first data input and the second data input include the common key, the instructions cause the one or more processors to determine whether the first data input and the second data input each include a column of data associated with the common subject.

In some embodiments, to join the first data input and the second data input, the instructions cause the one or more processors to perform structured query language join statements between the first data input and the second data input.

In some embodiments, to determine whether the one or more values are missing, the instructions cause the one or more processors to determine whether a first column does not have a data value that corresponds to a subject value of the at least one subject column.

In some embodiments, to generate the fill values for each missing value, the instructions cause the one or more processors to at least one of: enter a default value into each missing value; enter a median value of a column of data associated with each missing value; or enter an average value of the column of data associated with each missing value.

In some embodiments, the subject columns include data values identifying the plurality of data points, and wherein the parameter columns include data values associated with the position associated with each of the plurality of data points and the one or more additional dimensional attributes for each data point.

In some embodiments, to categorize the first column into the parameter type, the instructions cause the one or more processors to determine that the first column includes one of ordinal data, nominal data, discrete data, continuous data, date data, or snapshot data.

In some embodiments, the one or more additional dimensional attributes include at least one of a ball size dimension, a ball color dimension, a ball shape dimensions, an additional symbol dimension, or a time dimensions.

In some embodiments, wherein to determine whether the plurality of data points overlap each other in more than a threshold amount along at least a first plot dimension of the at least three plot dimensions, the instructions cause the one or more processors to: determine a number of data point overlaps, wherein a data point overlap includes two data points that intersect on at least the first plot dimension; and determine the number of data point overlaps exceeds the threshold amount.

In some aspects, the techniques described herein relate to a non-transitory computer readable recording medium for storing instructions, when executed by one or more processors, configured to perform the methods described herein.

Any of the features of an aspect is applicable to all aspects identified herein. Moreover, any of the features of an aspect is independently combinable, partly or wholly with other aspects described herein in any way, e.g., one, two, or three or more aspects may be combinable in whole or in part. Further, any of the features of an aspect may be made optional to other aspects. Any aspect of a method can comprise another aspect of a system. Furthermore, any aspect of a system can be configured to perform a method of another aspect.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

These and other features, aspects, and advantages of the present application are described with reference to drawings of certain embodiments, which are intended to illustrate, but not limit, the present disclosure. It is to be understood that the attached drawings are for the purpose of illustrating concepts disclosed in the present application and may not be to scale.

DETAILED DESCRIPTION

Figure 1:
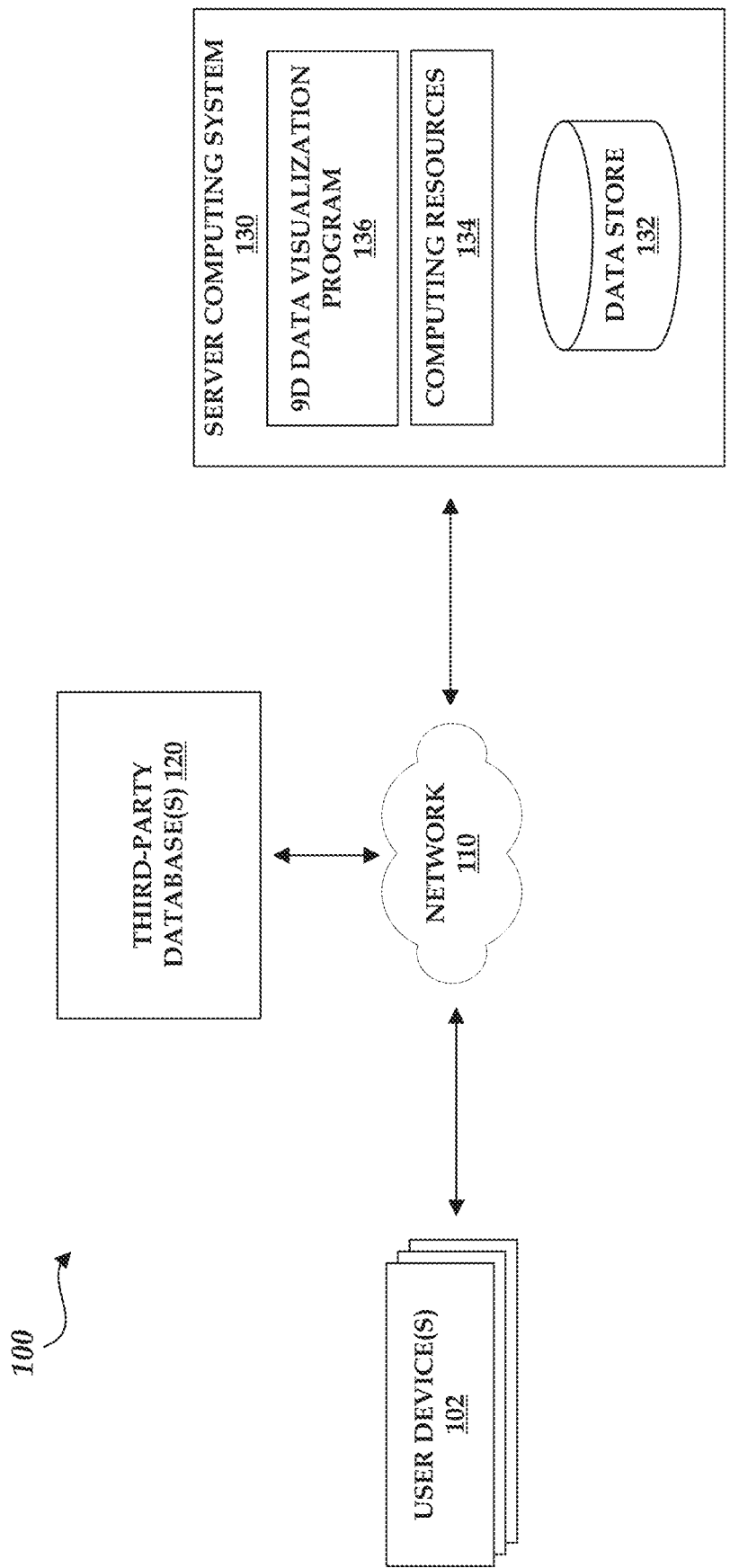
FIG. 1 illustrates an embodiment of a computing environment for implementing a multi-dimensional visualization program.

Analytics has become a part of the modern world of consumers and businesses. Often individuals and businesses use analytics without knowing it. For example, when a person purchases something or searches for homes, rentals, hotels for vacation on a website, they are leveraging analytics provided by that system. However, the analytics built today have limited dimensions. With the introduction of modern tools and 3D rendering technologies, huge improvements can be made to data exploration.

Disclosed are methods and systems for the image processing of multiple dimensions of data for use on a two-dimensional form factor user interface (2D form factor). The methods and systems disclosed can enable users to view all the dimensions required for some analytical processes.

One aspect of this disclosure provides a system and method that can analyze, for example, up to nine dimensions using a 2D form factor. Another aspect of the disclosure provides a system and method that can analyze, for example, dimensions lower or higher than nine dimensions using a 2D form factor.

By allowing users to view multiple dimensions of data, the users can make decisions with improved quality and ease that are otherwise challenging to make using traditional analytics. In some aspects, the disclosed methods and systems include improvements over traditional analytics, such as extract, transform and load (ETL) analytics and data model creation analytics. For example, the methods and systems can include automatic axis scaling, increasing the number of entities that can be reasonably analyzed using a 2D form factor. As another example, the methods and system can utilize a unified effect of the multiple displayed dimension (e.g., X-axis, Y-axis, Z-axis, ball size, ball color, ball shape, etc.) to enable the analysis of complex multi-dimensional data sets. As yet another example, the addition of the multiple dimensions (e.g., Z-axis, ball color, ball shape, additional simple, etc.) can enable identification and exploration of similar and polar opposite entities.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Overview

Generally described, aspects of the present disclosure relate to the generation and presentation of graphical user interfaces (GUIs) for presenting analytical data. For example, aspects of the present disclosure relate to the use of a multi-dimensional (e.g., nine dimensional (9D)) data visualization program that can advantageously depict up to, for example, nine dimensions of analytical data on a GUI. As will be described in more detail below, aspects of the present disclosure correspond to the use of modules within the multi-dimensional data visualization program to transform input data into visualization data that is presented on one or more GUIs.

Overview of Computing Environment

FIG. 1 illustrates an embodiment of a computing environment 100 for implementing a multi-dimensional visualization program 136. The multi-dimensional visualization program 136 may include a 9D visualization program. For the purpose of convenience, the description will be made mainly based on 9D visualization program. However, the present disclosure is not limited thereto, and other multi-dimensional visualization programs such as lower or higher than 9D visualization programs. The environment 100 can include a network 110, one or more user device(s) 102, a third-party database 120, and server computing system 130. The server computing system 130 may communicate via the network 110 with the user device(s) 102 and the third-party database 120. Although only one network 110 is illustrated, multiple distinct and/or distributed networks 110 may be used. The network 110 can include any type of communication network. For example, the network 110 can include one or more of a wide area network (WAN), a local area network (LAN), a cellular network, an ad hoc network, a satellite network, a wired network, a wireless network, and so forth. In some embodiments, the network 110 can include the Internet.

User Devices

FIG. 1 illustrates exemplary user devices 102 associated with one or more users. A user device 102 may include hardware and software components for establishing communications over a communication network 110. For example, the user device 102 may be equipped with networking equipment and network software applications (for example, a web browser) that facilitate communications via one or more networks (for example, the Internet or an intranet). The user device 102 may have varied local computing resources such as central processing units (CPU) and architectures, memory, mass storage, graphics processing units (GPU), communication network availability and bandwidth, and so forth. Further, the user device 102 may include any type of computing system. For example, the user device 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the user device 102, are referred to generally as computing resources. The computing resources may include hardware, software, or a combination thereof. The computing resources may include one or more processing circuits and/or one or more processing modules.

The user device 102 can communicate with the server computing system 130, via the network 110, to interact with 9D data visualization program 136. For example, the user device 102 can interact with the 9D data visualization program 136 to enter input data, select data columns, receive user interface data, enter data filters, etc.

Third-Party Databases

The third-party databases 120 may include one or more internal and/or external data sources that can store data for use in the 9D data visualization program 136. In some embodiments, one or more of the data repositories or the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas), a non-relational database, or a record-based database. The above listed databases are merely examples and other databases may also be used.

Server Computing System

The server computing system 130 may include a datastore 132, computing resources 134, and 9D data visualization program 136. The configuration of the server computing system 130 shown in FIG. 1 is merely an example and other configuration is also possible. For example, one or more of the elements of the server computing system 130 may be omitted, combined into others, or another element may be added to the server computing system 130. The computing resources 134 can include one or more computing devices, such as servers and databases for managing the various process described herein. The datastore 132 can include databases, local memory, cloud memory, and the like, for storing data sets, user account information, etc.

The server computing system 130 can include one or more application host systems, such as the 9D data visualization program 136 and data source(s), such as the datastore 132. The server computing system 130 may include one or more computing systems configured to execute at least a portion of the 9D data visualization program 136. In some embodiments, the one or more application host systems can include one or more computing devices, such as servers and databases that may host and/or execute a portion of one or more instances of the 9D data visualization program 136. In certain embodiments, instead of or in addition to executing a portion of the 9D data visualization program 136, the application host systems may execute another application, which may complement and/or interact with the 9D data visualization program 136 during execution of an instance of the 9D data visualization program 136 by the user device 102.

The server computing system 130 may run on a variety of computing devices, such as a server, a Windows server, a Structure Query Language server, a Unix Server, a personal computer, a laptop computer, a smart phone, a personal digital assistant, a tablet, and so forth. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth. In other embodiments, the server computing system 130 may run on a cluster computer system, a mainframe computer system and/or other computing system suitable for controlling and/or communicating with large databases, performing high volume transaction processing, and generating reports from large databases. The computing system is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

Access to the 9D data visualization program 136 by the user devices 102 and/or by data sources, such as datastore 132, may be through a web-enabled user access point. The user devices 102 may have a browser module that is implemented as a module that uses text, graphics, audio, video, and/or other media to present data and to allow interaction with data via the network 110.

The server computing system 130 may include one or more internal and/or external data sources (for example, datastore 132). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas), a non-relational database, or a record-based database.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

9D Data Visualization Program

A 9D data visualization program 136 can provide the various services and processes described herein. For example, the 9D data visualization program 136 can include various programs, applications, application programming interfaces (APIs), and the like for interfacing with user devices 102 and third-party databases 120. The 9D data visualization program 136 is described in more detail with respect to FIG. 2A.

The 9D data visualization program 136 can utilize various modules to process various data inputs to create a multi-dimensional visualization on a 2D form factor. An example of a result provided by the 9D data visualization program 136 based on a set of inputs is shown in table 1 below:

TABLE 1

| Setup Dimension | Example Data |
| --- | --- |
| Subject | Equity (Data to be analyzed) |
| X Axis | P/E Ratio (Numeric Data) |
| Y Axis | Dividend Yield (Numeric Data) |
| Z Axis | 52 Week High-Low (Relative Range of % based on numeric data) |
| Ball Size * | Market Cap (Numeric Data) |
| Ball Color * | Industry Segment (Non-Numeric Data) |
| Ball Shape * | Growth vs (Non-Numeric Boolean) |
| Additional Symbol * | Expected Result in 7 Days (Non-Numeric Boolean) |
| Movement by Time * | Date (Date Optional) |

In the table, the setup dimension parameters and example data can be interchangeable. For example, while X Axis represents P/E ratio in the illustrated table, P/E ratio can be represented by Y Axis or Z Axis. Similarly, dividend yield can be represented by X Axis or Z Axis, and 52 week high-low can be represented by X Axis or Y Axis. This applies to example data for ball size, ball color, ball shape, additional symbol, and movement by time dimensions so that at least one of the setup dimension parameters can represent example data different from those illustrated in the above table.

Moreover, the variables and parameters shown in the above table are merely examples used for analyzing a stock market, and the present disclosure is not limited thereto. For example, many other different scenarios (use cases) can be used based on customized different variables and parameters. For example, parameters, such as Lot Size, Price/Square Foot, Year Built, House Type, Total Price, Total Taxes and Fees, School Zone Rating, and Distance from School, can be used to analyze housing data. As another example, parameters, such as University Ranking, Total Tuition Fees, Average cost of Living in City/Area, Median Salary, Geographical Region, Offers OPT/CPT, Min GRE Score, TA/RA Job Rate (In Percentage), may be used to analyze Universities for foreign students. The generation of the above example table is described in more detail with respect to FIG. 2B.

Figure 3A:
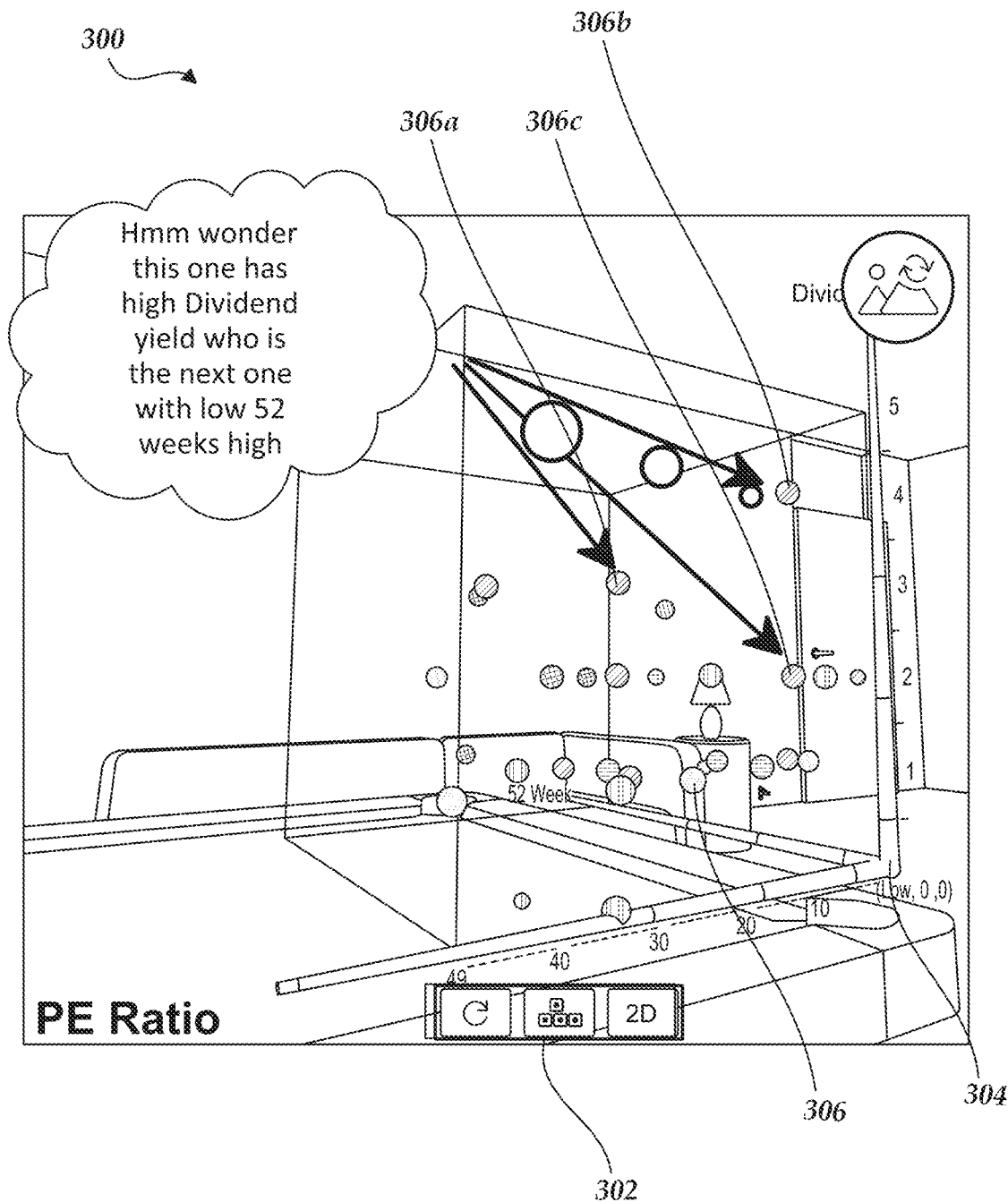
FIGS. 3A-3C illustrate example graphical user interfaces that can be produced by the multi-dimensional data visualization program.
Figure 3B:
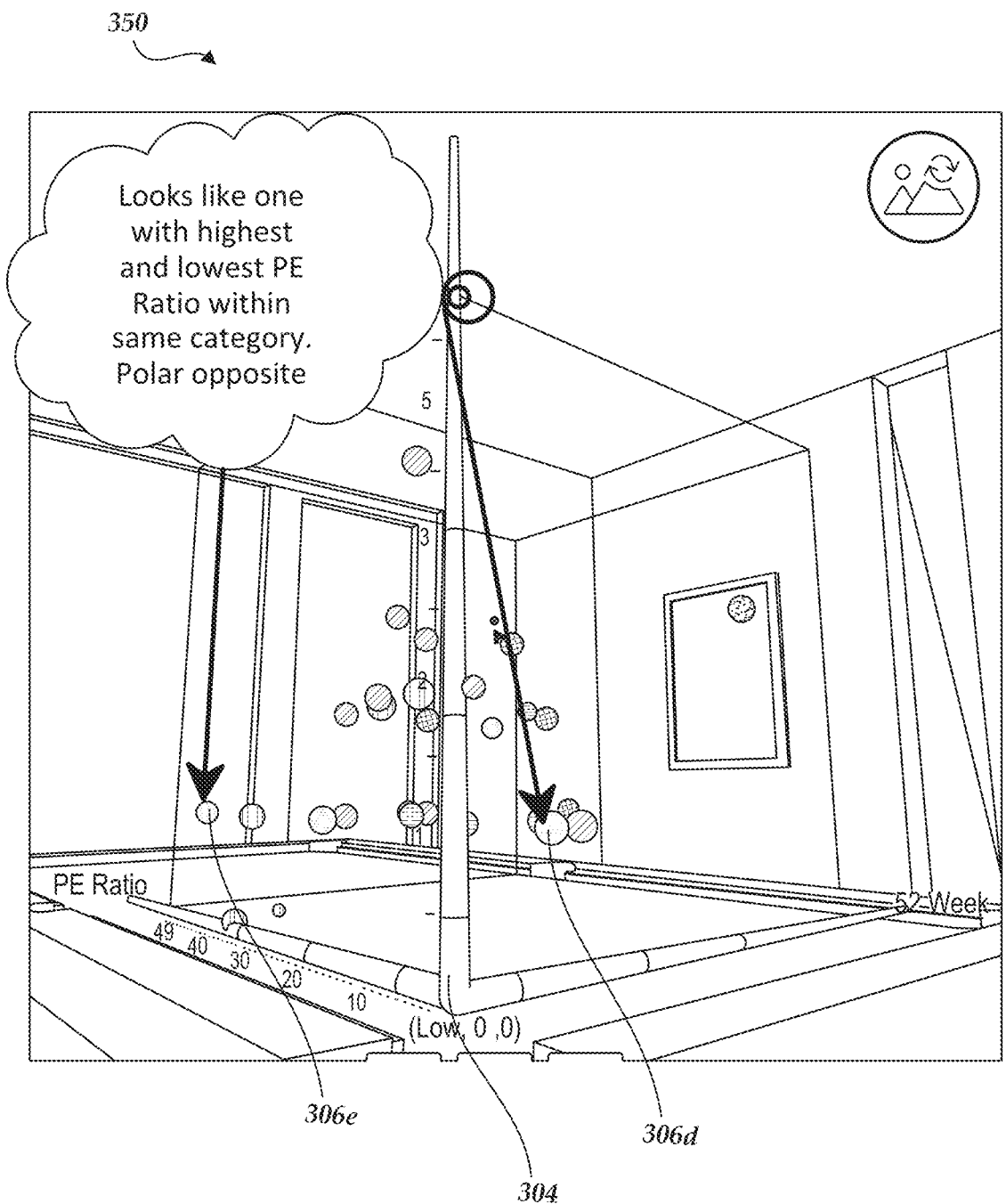
Figure 3C:
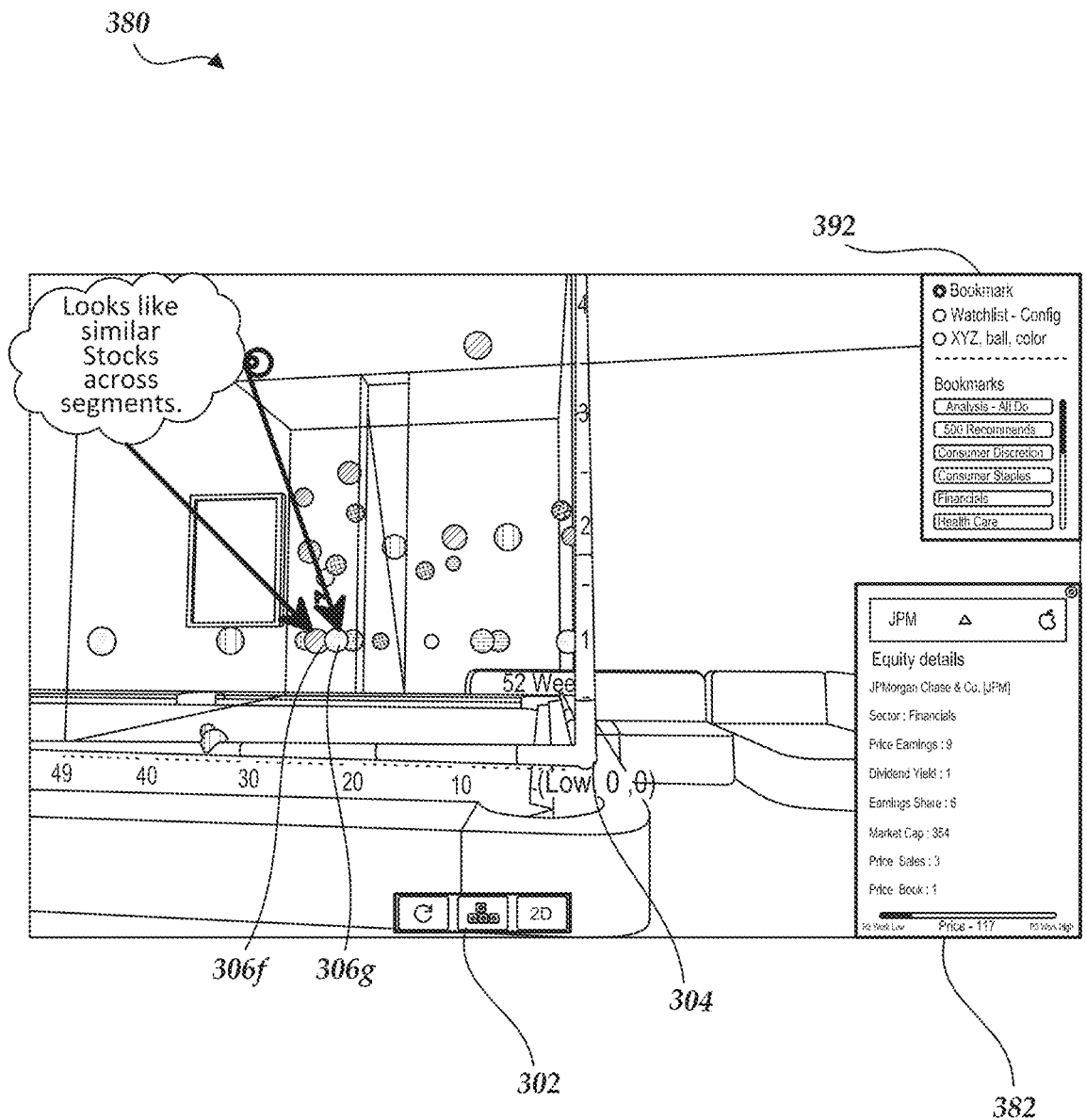

FIGS. 3A-3C illustrate example graphical user interfaces that can be produced by the 9D data visualization program 136. The example graphical user interfaces may be shared or otherwise transmitted to the user devices 102. For example, the graphical user interfaces may be displayed on an application, web browser, etc. of the user devices 102. FIGS. 4-8 illustrate example process flow diagrams of various functionality and processes that can be performed by the 9D data visualization program 136.

Example Block Diagram of 9D Data Visualization Program

Figure 2A:
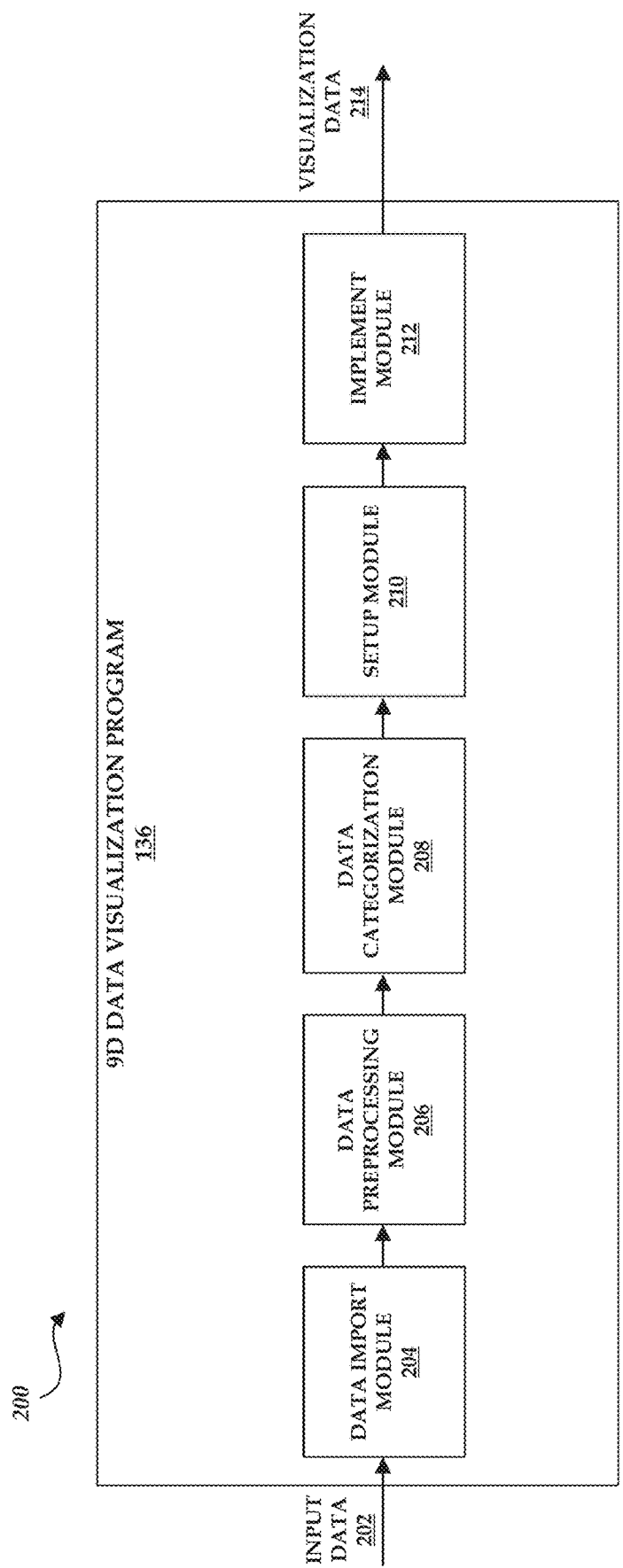
FIG. 2A illustrates an example block diagram depicting example functionality of the multi-dimensional data visualization program.

FIG. 2A illustrates an example block diagram 200 depicting example functionality of the 9D data visualization program 136. In the illustrated example, the 9D data visualization program 136 includes a data import module 204, a data preprocessing module 206, a data categorization module 208, a setup module 210, and an implement module 212. At least one of the modules 204-210 can be implemented with a processor. The 9D data visualization program 136 can receive input data 202 and process the input data to generate visualization data 214. The configuration or layout of the 9D data visualization program 136 shown in FIG. 2A is merely an example, and other configuration is also possible. For example, one or more of the elements of the 9D data visualization program 136 may be omitted, combined into others, or another element may be added to the 9D data visualization program 136.

The input data 202 can include one or more data sets that can be utilized by the 9D data visualization program 136. The input data 202 may be, for example, comma-separated values (.csv), excel binary file format (.xls), from relational databases (RDBMS), and/or from a nonrelational database (NoSQL), but the present disclosure is not limited thereto. All or a portion of the input data 202 may be imported from a user device, such as from one or more of the user devices(s) 102, from a third-party database, such as third-party database 120, and/or previously stored on the server computing, such as in data store 132 of the server computing system 130. The input data may be stored on the server computing system, such as in data store 132 of the server computing system 130 for use in the various modules of the 9D data visualization program 136.

The data import module 204 may receive the input data 202 and confirm the input data 202 satisfies a base criteria for running the 9D data visualization program 136. The base criteria may be a minimum requirement for the input data 202 in order for the 9D data visualization program 136 to formulate one or more GUIs, such as the GUIs described with reference to FIGS. 3A-3C. In some embodiments, the input data 202 satisfies the base criteria if the import data has at least one data column corresponding to a subject and at least three data columns corresponding to parameters. Different base criteria may be used. For example, the input data 202 may satisfy the base criteria with more or fewer data columns corresponding to subjects and more or fewer data columns corresponding to parameters. In some embodiments, the input data 202 may satisfy the base criteria with no data columns corresponding to subjects or no data columns corresponding to parameters. The data import module 204 is described in further detail with respect to FIG. 4.

The data preprocessing module 206 may receive the input data 202 that was confirmed by the data import module 204. The data preprocessing module 206 may join any linked data sets and fill any missing data. Two or more data sets can be connected. For example, two of more data sets can refer to a common subject (e.g., two data sets can refer to a common entity). A common key (also referred to as a "primary key" or a "foreign key") may indicate that two or more data sets are connected. For example, subject data in two data sets may refer to a common subject. In a nonlimiting example, a first data set may have an employee table with the following columns: emp_ID (employee ID), emp_name (employee name), emp_age (employee age), and emp_gender (employee gender). In this example, the emp_ID and emp_name columns are potential subject columns that can be used as a common key. If a second data set is present with the columns emp_ID and emp_salary (employee salary), then emp_ID can act as a common key that can potentially link emp_salary with the other data columns of the first data set.

While the above examples identify the common key as a common subject, the common key is not limited to these examples. For example, the common key may be a common column of data across two or more data sets. The common key may also be determined through unique identifiers for data sets, identifier of data set sources, and/or other indicators that two or more data sets may be analyzed as a single data set.

The data preprocessing module 206 may join two or more connected data sets by performing join operations. A join operation may unify the data sets into a single data set. The join operation can allow all the relevant data with a common key to be processed and/or analyzed by the server computing system 130 together. The join operation can be, for example, structured query language (SQL) join statements, such as inner join, left join, right join, full join, etc. Returning to the nonlimiting example described above, the join operation can combine the first data set and the second data set into a single unified data set in an employee table that contains emp_ID, emp_name, emp_age, emp_gender, and emp_salary in columns.

The data preprocessing module 206 may perform a data fill by entering fill values for missing data in the input data 202. Missing data can be individual data cells, ranges of cells, and/or other gaps of data in a data set. For example, a column of data may have data cells that do not contain data or contain data that is incompatible with the column (e.g., a nonnumeric value in a column of parameter values). A type of a fill value can vary based on properties of the data set. In some embodiments, a fill value can be a default value or a calculated value (e.g., median, average, etc.) based on corresponding or relative data values. For example, for a data column configured to show daily values of a commodity, a data fill can utilize historical data and/or corresponding data cells to calculate a fill value for a missing data value. In another example, a data column configured to set a flag when certain conditions are met (e.g., set a Boolean value to true) can have a default fill value indicating the conditions are not met (e.g., the default Boolean value is false). The data preprocessing module 206 is described in further detail with respect to FIG. 5.

The data categorization module 208 may receive data that was processed by the data preprocessing module 206. The data categorization module 208 may categorize the data received from the data preprocessing module 208 into subjects and/or parameter categories. Values stored in a data set can be subject values or parameter values. A subject value is a data point that one or more parameters values provide information for. For example, a data set may provide equity information on various entities. In this example, the data set may have a parameter value column of data identifying entities. The same data set may also have additional columns of parameter values for that identify information on the various entities (e.g., P/E ratio, dividend yield, 52 week high-low, market cap, industry segment, growth vs, expected result in 7 days, date, etc.). Parameter may be categorized into various parameter types. For example, a parameter can be ordinal data, nominal data, discrete data, continuous data, dates, snapshots, other/uncategorized, to name a few. Data may have properties associated with the type of parameter. For example, ordinal data may be associated with ordered data columns, nominal data may be associated with unordered data columns, continuous data may be associated with float value columns, and dates, snapshots and other/uncategorized data may be associated with integer data columns, to name a few. The above examples are not limiting. For example, other parameter types and data properties may also be used by the server computing system 130 to categorize the parameter type.

The data categorization module 208 may determine possible dimensions a parameter can be assigned to based on the categorization of the parameter. For example, the system may determine that a parameter with a continuous data type can be assigned to the X-axis, Y-axis, Z-axis, ball size, etc. based on a user selection in the setup module 210, described below.

In some embodiments, the data categorization module 208 can define one or more relative axes and identify and mark outliers based at least in part on the data categorization. For example, the data categorization module 208 can determine minimum and maximum values for a column and define a relative axis and identify and mark outlier based on the determination. The data categorization module 208 may not calculate minimum and maximum values for some columns, such as for column with a Boolean type.

Examples of results provided by the data categorization module 208 based on data received from the data preprocessing module 206 are shown in the table 2 and table 3 below:

TABLE 2

| Parameter | Type | Possible Dimension | Range |
| --- | --- | --- | --- |
| Lot Size | Discrete | X, Y, Z Axis based on choice | Min-Max (Possible)/Average |
| Price/Sq Ft | Discrete | X, Y, Z Axis based on choice | Min-Max (Possible)/Average |
| Year Built | Discrete | X, Y, Z Axis based on choice | Min-Max (Possible)/Average |
| House Type (Townhome, Condo, Single House, etc.) | Nominal | Object Color | |
| Total Price | Continuous | Ball Size/XYZ | Min-Max (Possible)/Average |
| HOA + Taxes + Fees | Continuous | Ball Size/XYZ | Min-Max (Possible)/Average |
| School Rating (Good, Medium, Low) | Ordinal | Ball Color/Shape | |
| School Rating (1-9) | Discrete | Ball Size/XYZ | Min-Max (Possible) |
| Distance from School | Continuous | | |

TABLE 3

| Parameter | Type | Possible Dimension | Range |
| --- | --- | --- | --- |
| University Ranking | Discrete | X, Y, Z Axis based on choice or Ball Size | Min-Max (Possible)/Average |

TABLE 3-continued

| Parameter | Type | Possible Dimension | Range |
|---|---|---|---|
| Total Tuition | Continuous | X, Y, Z Axis based on choice or Ball Size | Min-Max (Possible)/Average |
| Average Cost of Living in City/Local Area | Discrete | X, Y, Z Axis based on choice or Ball Size | Min-Max (Possible)/Average |
| Median Salary | Continuous | X, Y, Z Axis based on choice or Ball Size | Min-Max (Possible)/Average |
| University Region (e.g., Southwest, Central, etc.) | Nominal | Object Color | |
| Offers OPT/CPT | Boolean | Ball Color | |
| Minimum GRE Score | Discrete | X, Y, Z Axis based on choice or Ball Size | Min-Max (Possible)/Average |
| TA/RA Job Rate (in percentage) | Discrete | X, Y, Z Axis based on choice or Ball Size | Min-Max (Possible) |

The subjects and parameters shown in the above tables are merely examples used for analyzing housing markets and analyzing Universities, and the present disclosure is not limited thereto. For example, many other different scenarios (use cases) can be used based on customized different subjects and parameters. The data categorization module 208 is described in further detail with respect to FIG. 6.

The setup module 210 may receive data that was categorized by the data categorization module 208 and receive selection of the data to be plotted by the 9D data visualization program 136. For example, the setup module 210 can receive user inputs that select one subject data and parameter data for the selected subject. The selections of parameters and subjects can be associated with plotting dimensions. In a nonlimiting example, the server computing system 130 can receive a selection of nine dimensions of parameters and subjects regarding equity data. In this example, the selection can include entity data as a subject, P/E Ratio data as an X-axis, dividend yield data as a Y-axis, 52 week high-low data as a Z-axis, market cap data as a ball size, industry segment data as a ball color, growth vs data as ball shape, expected result in 7 days data as an additional symbol, and date data as a movement by time. While the above example identifies nine specific dimensions, a different number or type of dimensions may be used. For example, as few as three dimensions may be used and different dimensions (e.g., higher than nine dimensions) may also be used.

In some embodiments, the setup module 210 may present a user a list of possible dimensions for each parameter that was categorized by the data categorization module 208. For example, the system may present a list of the X-axis, Y-axis, Z-axis, ball size, etc. to a user for a parameter with a continuous type. Examples of possible dimensions of parameter types are shown in the table 2 and table 3 shown above.

In some embodiments, the setup module 210 can confirm if parameters have been assigned to at least three dimensions for each selected subject. For example, the server computing system 130 can require that parameter data be assigned to each of the X-axis, Y-axis, and Z-axis. The setup module 210 is described in further detail with respect to FIG. 7.

The implement module 212 may receive the selected data from the setup module 210 and generate and/or configure visualization data 214 to be sent to the user devices 102. For example, the setup module 210 can generate and/or configure the user interfaces as described with respect to FIGS. 3A-3C. The implement module 212 can calculate data point positions and other parameters. For each data point a position and other parameters may be calculated using the parameters associated with the data point. For example, using dimensions such as X-axis, Y-axis, Z-axis, ball size, ball shape, and movement by time, a position can be calculated for each data point and using dimensions such as ball color and additional symbol other parameters may also be calculated for each data point.

The implement module 212 can determine if the data points overlap each other in three-dimensional space more than a threshold amount. Once the position is calculated for each data point, the implement module 212 can determine if any data points overlap in one or more dimensions, such as the X-axis, Y-axis, and/or Z-axis. The threshold can determine how many data points can overlap. For example, the threshold may be set at 30%, indicating a positive determination if more than 30% of data points overlap on one or more dimensions. The above threshold (30%) is merely examples, and many other thresholds such as 35%, 40%, 50%, 60%, any other percentages therebetween, etc., can also be used.

If the data points overlap each other in three-dimensional space more than the threshold amount, the implement module 212 can rescale one or more of the axes. The implement module 212 may determine an axis to rescale based on which axis is determined to have the most amount of overlap. For example, if the implement module 212 determines that 40% of the data points overlap on the X-axis, 12% of the data points overlap on the Y-axis, and 30% overlap on the Z-axis, the server computing system 130 can increase the X-axis to allow more space on the X-axis for the data points and recalculate the data point positions. The implement module 212 can continue this process until a data point overlap does not exceed the threshold.

In some embodiments, the implement module 212 can calculate reference indicators. The reference indicators can be calculated based on the data points. For example, the reference indicators may represent average and median values for each axis. The reference indictors may include graphical representation to be plotted on a graph. For example, the reference indictors may include reference lines and/or reference planes that intersect with one or more of the axes.

The implement module 212 can generate and/or configure a virtual three-dimensional space and place each data point in the virtual space based on the calculated axes and the parameter values for each data point. The implement module 212 may also place any calculated reference indicator in the virtual three-dimensional space. The virtual three-dimensional space can be transmitted as visualization data 214 to user devices 102 such that the virtual three-dimensional space is displayed on one or more user devices, such as user device(s) 102.

The visualization data 214 can include filter selections. The filter selections can be one or more filters configured to add and/or remove data points or modify the graph in some way during runtime. For example, the filters can alter displayed parameters, alter minimum/maximum parameter values, remove flagged outliers, alter color/shape of datapoints, etc. The filters can be displayed on a graphical user interface, such as user device(s) 102. For example, the filters can correspond to graphical user interface 300, graphical user interface 350 and/or graphical user interface 380, as described with reference to FIGS. 3A-3C. When a filter is selected, the visualization data 214 can reconfigure the visualization data 214 with the filter applied to the data points.

Figure 2B:
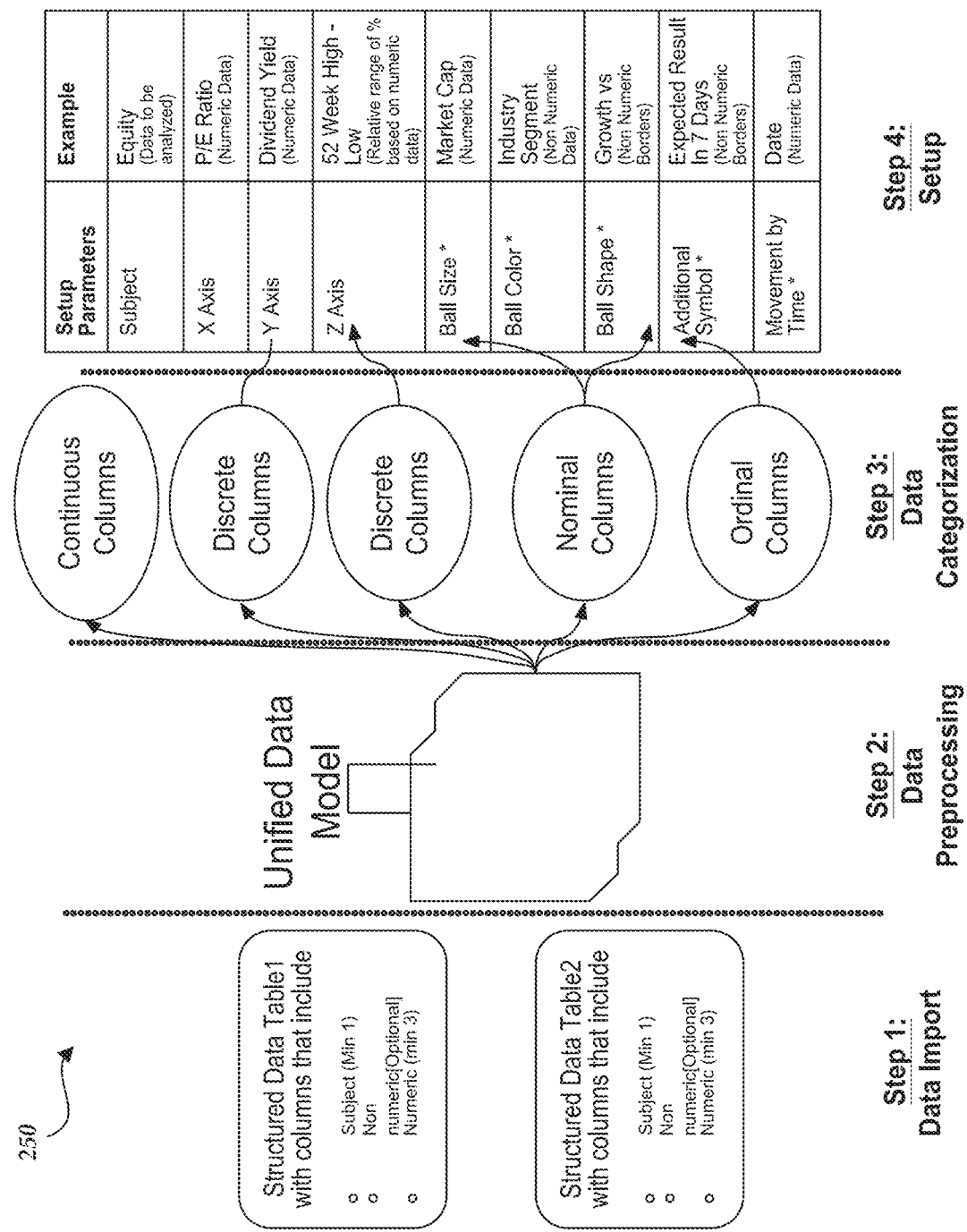
FIG. 2B illustrates a flow diagram depicting an example implementation of the multi-dimensional data visualization program.

FIG. 2B illustrates a flow diagram depicting an example implementation 250 of the 9D data visualization program 136. Example implementation 250 illustrates the 9D data visualization program 136 generating the result table, as described with respect to FIG. 1. While example implementation 250 illustrates Steps 1-4, more or fewer steps may be used. Further additional steps not shown may be performed by the 9D data visualization program 136. For example, the resulting data shown in example implementation 250 may undergo further processing by the 9D data visualization program 136, such as by the implement module 212, as described with reference to FIG. 2A.

At Step 1 of example implementation 250, the 9D data visualization program 136 imports structured data table 1 and structured data table 2. For example, the 9D data visualization program 136 can utilize the data import module 204, as described with respect to FIG. 2A, to import structured data table 1 and structured data table 2. Each structured data table includes at least one subject column, at least three numeric columns, and optionally includes one or more nonnumeric columns.

At Step 2 of example implementation 250, the 9D data visualization program 136 preprocesses structured data table 1 and structured data table 2. For example, the 9D data visualization program 136 can utilize the data preprocessing module 206, as described with respect to FIG. 2A, to preprocess structured data table 1 and structured data table 2. Example implementation 250 illustrates that structured data table 1 and structured data table 2 undergo join operations, resulting in a unified data model that includes the data from both structured data table 1 and structured data table 2. Join operations are described in more detail with respect to FIG. 2A. In some embodiments, the preprocessing can also include a data fill operation as described with respect to FIG. 2A.

At Step 3 of example implementation 250, the 9D data visualization program 136 performs data categorization of the unified data model. For example, the 9D data visualization program 136 can utilize the data categorization module 208, as described with respect to FIG. 2A, to categorize the columns of the unified data model. While example implementation 250 illustrates the parameter columns of the unified data model are categorized into columns continuous data, discrete data, nominal data, and ordinal data, data columns can be categorized into other data types as well. For example, a parameter column of data can be categorized as date/timing data, snapshot data, and/or other uncategorized data and a nonparametric column can be categorized as a subject.

At Step 4 of example implementation 250, the 9D data visualization program 136 performs data setup of the unified data model. For example, the 9D data visualization program 136 can utilize the setup module 210, as described with respect to FIG. 2A, to setup the categorized columns of the unified data model to be compiled into visualization data. The 9D data visualization program 136 may receive user input selecting one or more columns of data to a setup dimension. The example implementation 250 illustrates continuous columns of "P/E Ratio" data are selected to the X-axis dimension, discrete columns of "Dividend Yield" data are selected to the Y-axis dimension, discrete columns of "52 Week High-Low" data are selected to the Z-axis dimension, nominal columns of "Market Cap" data are selected to the Ball Size dimension, nominal columns of "Growth vs" data are selected to Ball Shape dimension, and ordinal columns of "Expected Result in 7 days" data are selected to Additional Symbol dimension. The 9D data visualization program 136 may perform data set up on columns of data not illustrated in example implementation 250. Further, while not shown by directional arrows, example implementation 250 can include a user selection of data columns to assign to the subject dimension (such as "Equity" data), the Ball Color dimension (such as "Industry Segment" data) and the Movement by Time dimension (such as "Date" data).

While not shown in FIG. 2B, the 9D visualization program 136 may utilize the setup data from Step 4 to generate and/or configure visualization data 214 to be sent to the user devices 102, as described with reference to FIG. 2A.

Example Graphical User Interfaces

FIGS. 3A-3C illustrate example graphical user interfaces (GUIs) that are generated by the 9D data visualization program 136. In some embodiments, the GUIs depicted in FIGS. 3A-3C may correspond to GUIs described herein, such as with respect to FIG. 2A and FIG. 8. FIG. 3A illustrates GUI 300, FIG. 3B illustrates GUI 350, and FIG. 3C illustrates GUI 380. In some embodiments, GUI 300, GUI 350, and GUI 380 illustrate the same GUI at three different perspectives. This GUI can include a control pane 302, a plurality of data points 306, an axis display 304, a data point information pane 382, and a filter pane 392 (see FIG. 3C).

The data points 306 may be associated with a subject. Data point parameters, such as the location on the graph with respect to the axis display 304, color, shape, symbol, etc. of each data point 306 may be determined by the visualization data used to generate the graph. A user may select a data point 306 and view a data point information pane 382 associated with the selected data point. The data point information pane 382 may display data values for each parameter.

GUI 300, GUI 350, and GUI 380 can allow a user to easily analyze the relationship between multiple data points. For example, data points 306a-306c illustrate data points with the same Ball Color (e.g., "Industry Segment") and Ball Size (e.g., "Market Cap"), but have variable positions on the Y-axis (e.g. "Dividend Yield") and Z-axis (e.g., "52 High-Low"). GUI 300 may easily illustrate these traits of data points 306a-306c to a user. The user may then select each data point 306a-306c and view the data point information pane 382 to investigate the relationship further to determine what may be causing such distinctions.

The control pane 302 can allow a user to control aspects of the current displayed graph. The control pane 302 may include a refresh selection, a navigate selection, and a 2D selection. The refresh selection may be used to reset the graph into a default view. The navigate selection may be used to move the view of the graph. For example, the navigate selection may be used to alter an angle of view, zoom in on the graph, zoom out from the graph, etc. The 2D selection may cause the graph to project into two-dimensions. For example, a user selecting the 2D selection may cause the graph to remove a dimension of the axis display 304 (e.g., the dimension associated with the X, Y, or Z axis) of the data points. In some embodiments, the 2D selection can cause the graph to display a two-dimensional vector projection of the current view of the data points.

A user may utilize the control pane 302 to explore different perspectives of the data points. For example, a user may use the control pane 302 and change the perspective of GUI 300 to that of GUI 350 or GUI 380. While viewing these different perspectives, new relationships between data points 306 may become apparent. For example, from the perspective of GUI 350, a user can observe that data point 306d and data point 306e, which have the same Ball Color (e.g., "Industry Segment") and Ball Size (e.g., "Market Cap") are polar opposite with respect to the X-axis (e.g., "P/E Ratio"). Similarly, from the perspective of GUI 380, a user can observe that data point 306f and data point 306g, which have different parameter values for Ball Color (e.g., "Industry Segment"), have similar parameter values on various other dimensions, such as Ball Size (e.g., Market Cap), X-axis (e.g., "P/E Ratio"), Y-axis (e.g., "Dividend Yield"), and so on.

The filter pane 392 may allow a user to select one or more filters to alter the graph. For example, the user can select a filter that loads a bookmarked set of data points. In another example, the filters can allow a user to change how a parameter is displayed such as configuring colors, shapes, etc. of the data points 306. The filters may allow a user to remove a parameter from the graph. For example, the parameter assigned to ball color may be removed. The filters may also allow a user to set ranges for parameters. For example, a user can set a range for an axis to remove outliers or focus on a particular range. The above examples are not intended to be limiting and other filters may be used. For examples, shapes, sizes, and/or colors of the ball are merely examples and other shapes/sizes/colors an also be used. Furthermore, while circular/spheric shapes are shown in FIGS. 3A-3C, other shapes (e.g., polygon) can also be used.

A user may utilize the filter pane 392 to explore different subsets of the data points 306. For example, a user viewing GUI 380 may be interested in the relative values of the data points 306 along the X-axis but be unable to easily see the relation of a few data points 306 because they are too clustered or otherwise obscured in the current perspective. In this example, the user may apply one or more filters to increase the visibility of the clustered, or otherwise obscured data points, such as removing outlier data points, filtering by Ball Color, filtering by Ball Size, etc. A user may also use filter pane 392 to view a saved set of data points 306 (e.g., data points 306 that have been saved in a "Watchlist").

Example Processes

FIGS. 4-8 are process flow diagrams of a method for generating GUIs for viewing various dimensions (e.g., nine-dimensions) of data sets according to some embodiments. In some embodiments, the process flow diagrams of FIGS. 4-8 may be performed by at least one of the server computing system 130, the third-party database 120, and/or the user device(s) 102. In some embodiments, the process flow diagrams of FIGS. 4-8 may be performed by another computing device separate from and/or in data communication with at least one of the server computing system 130, the third-party database 120, and/or the device 102. For the purpose of convenience, the embodiments of FIGS. 4-8 will be described based on the server computing system 130 performing the process flow diagrams of FIGS. 4-8.

Although the process flow diagrams of FIGS. 4-8 are described herein with reference to a particular order, in various embodiments, states herein may be performed in a different order, or omitted, and additional states may be added.

FIGS. 4-8 include descriptions of data in particular data forms (e.g., data sets, data tables, data columns, etc.). Such data forms are used for convenience of description and are not meant to be limiting. For example, a data column may be used to refer to related data values (e.g., a data column of "daily temperature" may display temperature values corresponding to days of the year); however, the related data may be in a format other than a column.

Figure 4:
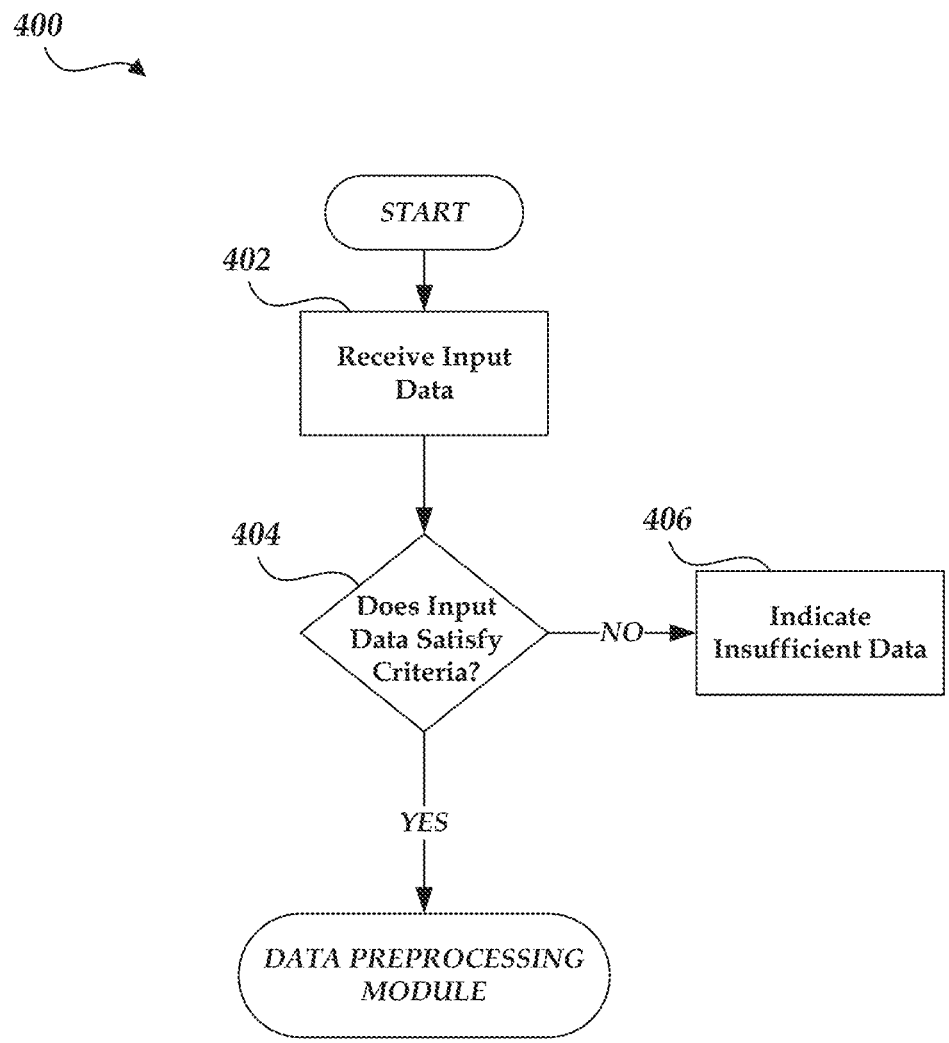
FIGS. 4-8 illustrate example process flow diagrams of various functionality and processes that can be performed by the multi-dimensional data visualization program.

Referring to FIG. 4, process flow diagram 400 illustrates a method for importing data for use in a data visualization program. In some embodiments, process flow diagram 400 may be performed by the server computing system 130. For example, process flow diagram 400 may correspond to the data import module 204, as described with reference to FIG. 2A.

At block 402, a server computing system, such as server computing system 130, can receive input data. The input data may be, for example, comma-separated values (.csv), excel binary file format (.xls), from relational databases (RDBMS), and/or from a nonrelational database (NoSQL), but the present disclosure is not limited thereto. All or a portion of the input data may be imported from a user device, such as from one or more of the user devices(s) 102, from a third-party database, such as third-party database 120, and/or previously stored on the server computing system, such as in data store 132 of the server computing system 130. The input data may be stored on the server computing system 130, such as in data store 132 of the server computing system 130.

At block 404, a determination is made as to whether the input data received at block 402 satisfies a base criteria for the data visualization program. As previously described, the data visualization program may have base criteria for imported data that must be satisfied for the data visualization program to formulate one or more GUIs, such as the GUIs described with reference to FIGS. 3A-3C. In some embodiments, the input data satisfies the base criteria if the import data has at least one data column corresponding to a subject and at least 3 data columns corresponding to parameters. Different base criteria may be used. For example, the input data may satisfy the base criteria with more or fewer data columns corresponding to subjects and more or fewer data columns corresponding to parameters. In some embodiments, the input data may satisfy the base criteria with no data columns corresponding to subjects or no data columns corresponding to parameters. If the determination at block 404 is negative, the process flow diagram 400 may proceed to block 406.

At block 406, the server computing system 130 can indicate that the input data is insufficient to run the data visualization program. The server computing system 130 may transmit to and/or cause the indication to be displayed on a user computing device. For example, the server computing system 130 may cause an indication that the input data is insufficient to be displayed on a user interface of one or more of the user computing device(s) 102. The indication can include information regarding the insufficiency. For example, if the server computing system 130 determines at block 404 that the input data does not have a data set corresponding to a subject, the indication can include a message to the user that the input data must have at least one subject. In some embodiments, the indication can include a prompt to the user to provide additional or different data.

If the determination at block 402 is positive, the process flow diagram 400 may conclude. In some embodiments, the conclusion of process flow diagram 400 triggers process flow diagram 500, as described with reference to FIG. 5, to begin. For example, the input data can be used at block 502 of process flow diagram 500.

Figure 5:
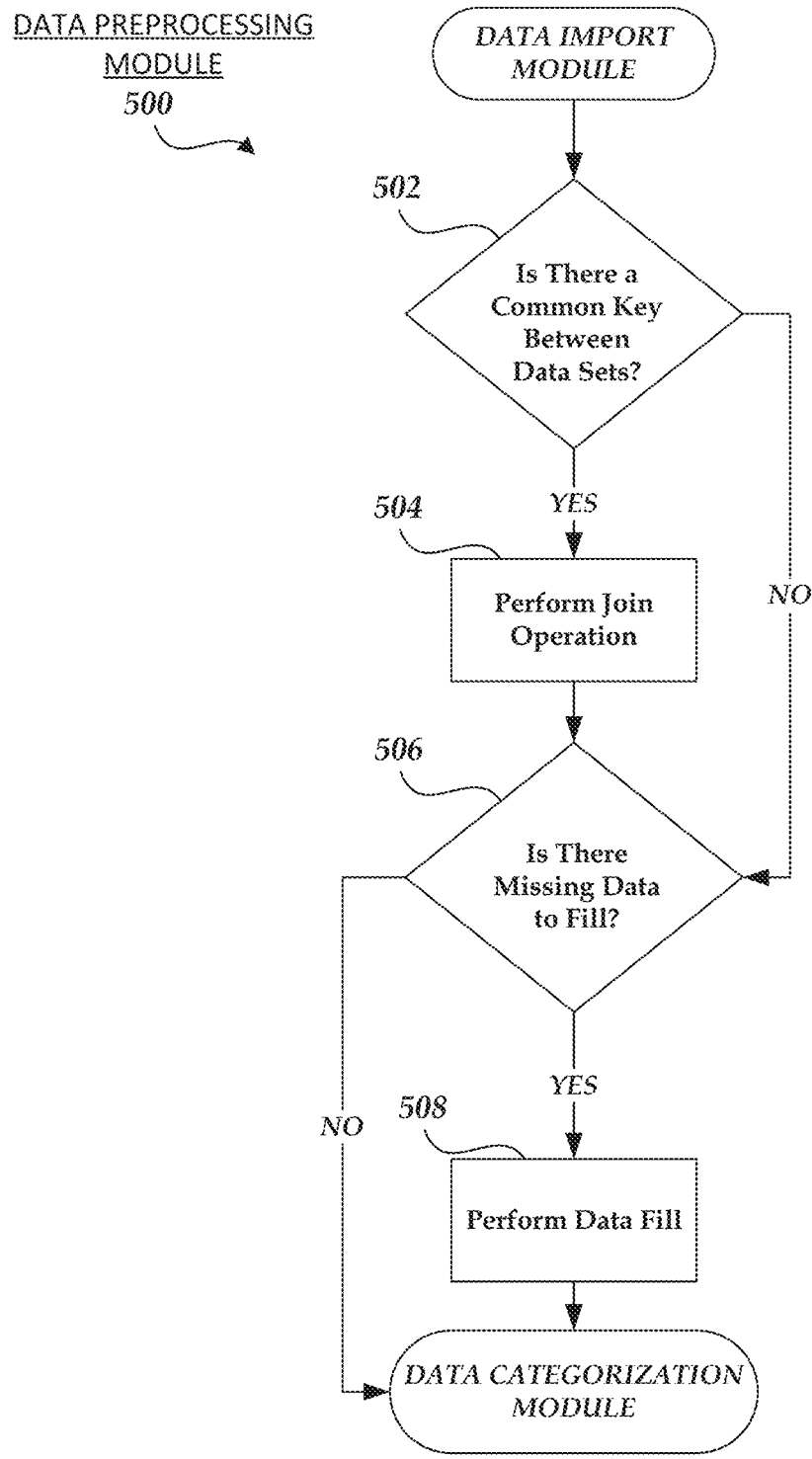

Referring to FIG. 5, process flow diagram 500 illustrates a method for data preprocessing for use in a data visualization program. In some embodiments, process flow diagram 500 may be performed by the server computing system 130. For example, process flow diagram 500 may correspond to the data preprocessing module 206, as described with reference to FIG. 2A.

At block 502, the server computing system 130 determines if there is a common key between the data sets. The data sets may correspond to the input data received at block 402 of process flow diagram 400, as described with reference to FIG. 4. As previously described, two or more data sets can be connected. For example, two or more data sets can refer to a common subject (e.g., two data sets can refer to a common entity). A common key (also referred to as a "primary key" or a "foreign key") may indicate that two or more data sets are connected. For example, subject data in two data sets may refer to a common subject. In this example, the server computing system 130 can determine that subject data in both data sets refer to a common subject and thereby determine there is a common key between the data sets. In a nonlimiting example, a first data set may have an employee table with the following columns: emp_ID (employee ID), emp_name (employee name), emp_age (employee age), and emp_gender (employee gender). In this example, the emp_ID and emp_name columns are potential subject columns that can be used as a common key. If a second data set is present with the columns emp_ID and emp_salary (employee salary), then emp_ID can act as a common key that can potentially link emp_salary with the other data columns of the first data set.

While the above example identifies the common key as a common subject, the common key is not limited to this example. For example, the common key may be a common column of data across two or more data sets. The common key may also be determined through unique identifiers for data sets, identifier of data set sources, and/or other indicators that two or more data sets may be analyzed as a single data set. If the determination at block 502 is positive, the process flow diagram 500 continues to block 504. If the determination at block 502 is negative, the process flow diagram 500 continues directly to block 506.

At block 504, the server computing system 130 performs a join operation between the two or more data sets determined to have a common key at block 502. The join operation may unify the data sets into a single data set. The join operation can allow all the relevant data with a common key to be processed and/or analyzed by the server computing system 130 together. The join operation can be, for example, structured query language (SQL) join statements, such as inner join, left join, right join, full join, etc. Returning to the nonlimiting example described at block 502, the join operation can combine the first data set and the second data set into a single unified data set in an employee table that contains emp_ID, emp_name, emp_age, emp_gender, and emp_salary in columns.

At block 506, the server computing system 130 determines if there are any missing data values in the data sets. Missing data can be individual data cells, ranges of cells, and/or other gaps of data in a data set. For example, a column of data may have data cells that do not contain data or contain data that is incompatible with the column (e.g., a nonnumeric value in a column of parameter values). If the determination at block 506 is positive, the process flow diagram 500 continues to block 508.

At block 508, the server computing system performs a data fill by entering fill values for each missing data values determined at block 506. A type of a fill value can vary based on properties of the data set. In some embodiments, a fill value can be a default value or a calculated value (e.g., median, average, etc.) based on corresponding or relative data values. For example, for a data column configured to show daily values of a commodity, a data fill can utilize historical data and/or corresponding data cells to calculate a fill value for a missing data value. In another example, a data column configured to set a flag when certain conditions are met (e.g., set a Boolean value to true) can have a default fill value indicating the conditions are not met (e.g., the default Boolean value is false).

If the determination at block 506 is negative, or at the completion of block 508, the process flow diagram 500 may conclude. In some embodiments, the conclusion of process flow diagram 500 triggers process flow diagram 600, as described with reference to FIG. 6, to begin. For example, the data sets of process flow diagram 500 can be loaded at block 602 of process flow diagram 600.

Figure 6:
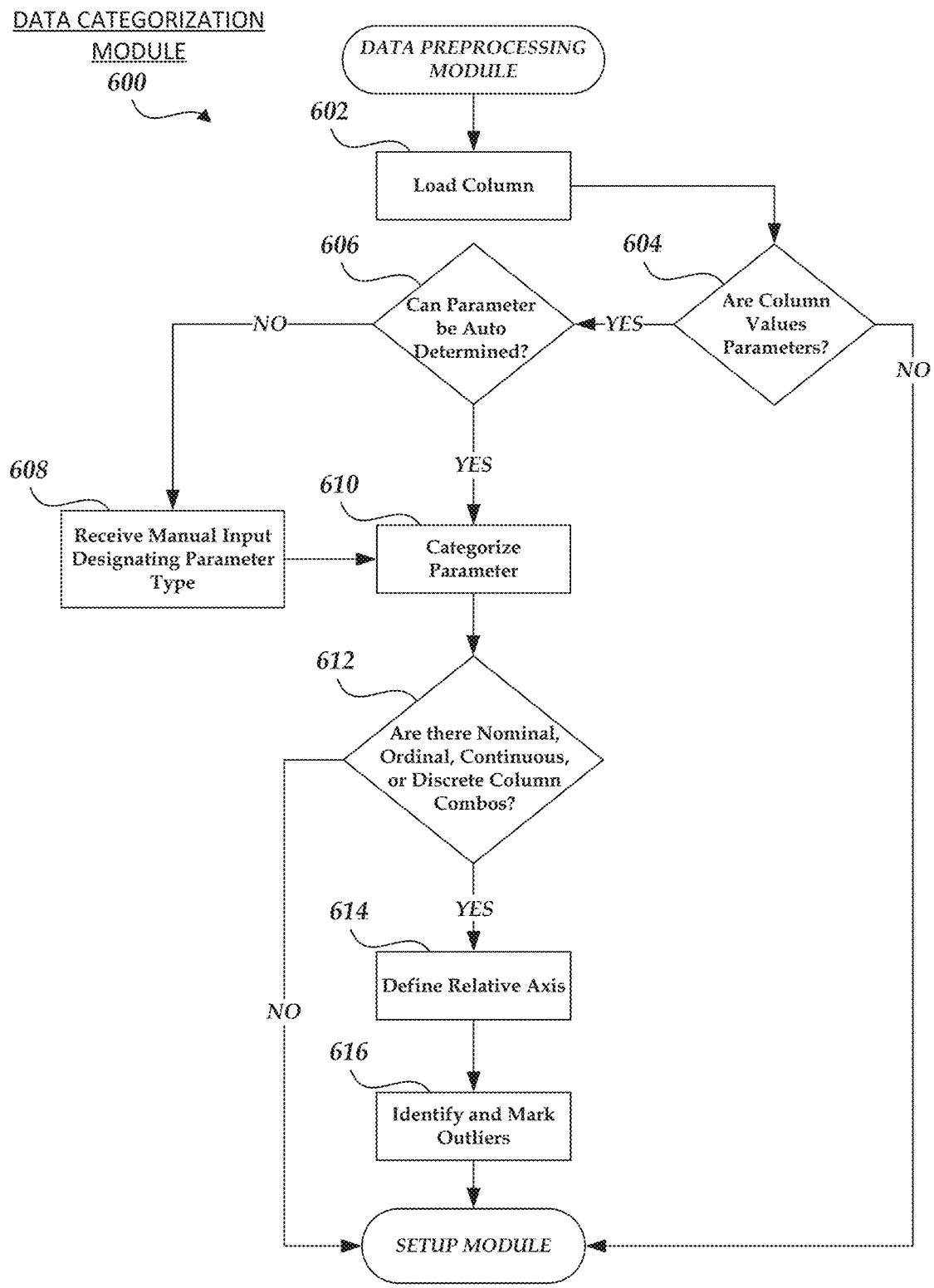

Referring to FIG. 6, process flow diagram 600 illustrates a method for data categorization for use in a data visualization program. In some embodiments, process flow diagram 600 may be performed by the server computing system 130. For example, process flow diagram 600 may correspond to the data categorization module 208, as described with reference to FIG. 2A. All, or a portion, of process flow diagram 600 may be repeated more than once. For example, blocks 602, 604, 606, 608, 610 of process flow diagram 600 may repeat until every column of the data sets has been processed by process flow diagram 600.

At block 602, the server computing system 130 loads a column of data from the data sets. For example, a data set that includes real estate data may have a first column of cities, a second column of median home price, and a third column of median household income. In this example, each of the first column, second column, and third column is loaded by the server computing system 130 one at a time.

At block 604, the server computing system 130 determines if the values of the loaded column are parameters. As previously described, values stored in a data set can be subject values or parameter values. A subject value is a data point that one or more parameters values provide information for. For example, a data set may provide equity information on various entities. In this example, the data set may have a parameter value column of data identifying entities. The same data set may also have additional columns of parameter values for that identify information on the various entities (e.g., P/E ratio, dividend yield, 52 week high-low, market cap, industry segment, growth vs, expected result in 7 days, date, etc.). If the determination at block 604 is negative, the process flow diagram 600 may conclude for that column of data and proceed to any additional columns of data in the data sets. If the determination at block 604 is positive, the process flow diagram 600 continues to block 606.

At block 606, the server computing system 130 determines if the parameter type can be autodetermined. Some forms of parameter data may be recognized by the server computing system 130 in standardized forms. For example, a column of data parameters with dates may have recognizable forms. The server computing system 130 can autodetermine a parameter type of the columns of data of any recognizable parameters forms. If the determination at block 606 is positive, process flow diagram 600 continues to block 610 where the parameter column is categorized by the server computing system 130. If the determination at block 606 is negative, process flow diagram 600 continues to block 608.

At block 608, the server computing system receives manual input designating a parameter type for the column. For example, a user may view the parameter column on a user interface and enter one or more inputs that designate the parameter type of column of data.

At block 610, the server computing system 130 categorizes the parameter type of the column. A parameter can have various types. For example, a parameter can be ordinal data (e.g., a parameter rating schools as "Good," "Medium," or "Low"), nominal data (e.g., a geographic region a school is located in, a type of a house, etc.), discrete data (e.g., the year a house is built, a University ranking, etc.), continuous data (e.g., the total price of a house, the total tuition fees of a University, etc.), dates or snapshots (e.g., date a house went on market), Boolean data (e.g., whether a university offers OPT or CPT), other/uncategorized, to name a few. The data of each column may have properties associated with the type of parameter. For example, ordinal data may be associated with ordered data columns, nominal data may be associated with unordered data columns, continuous data may be associated with float value columns, and dates, snapshots and other/uncategorized data may be associated with integer data columns, to name a few. The above examples are not limiting. For example, other parameter types and data properties may be used by the server computing system 130 to categorize the parameter type. In some embodiments, blocks 602, 604, 606, 608, 610 are repeated until all parameter columns of the data sets have been categorized.

At block 612, the server computing system 130 determines if the parameter columns of the data sets have combinations of nominal, ordinal, continuous, or discrete columns. In some embodiments, the server computing system 130 may receive a selection combining two or more nominal, ordinal, continuous, or discrete columns. If the determination at block 612 is negative, the process flow diagram 600 may conclude. If the determination at block 612 is positive, process flow diagram 600 continues to block 614.

At block 614, the server computing system 130 defines one or more relative axes. To define a relative axis, the server computing system 130 may assign a defining column and define the range for the axis. In some embodiments, the server computing system 130 can assign a column that was categorized as ordinal, continuous, or discrete as a defining column. In some embodiments, the server computing system 130 defines the range for the axis, at least in part, by determining a minimum and maximum value for the axis, based on default values stored on the server computing system 130, based on one or more user inputs and/or based on other factors.

At block 616, the server computing system 130 identifies and marks outlier values in the relative axes. For example, data values on a defining column of an axis may have one or more outlier values that can potentially scale the axis in a way that can cause data to be undesirably clustered otherwise difficult to present on a user interface. The server can mark the outlier values and store the mark on the server computing system to be accounted for later by the server computing system 130.

In some embodiments, the conclusion of process flow diagram 600 triggers process flow diagram 700, as described with reference to FIG. 7, to begin. For example, the categorized columns of process flow diagram 600 can be loaded and used at block 702 of process flow diagram 700.

Figure 7:
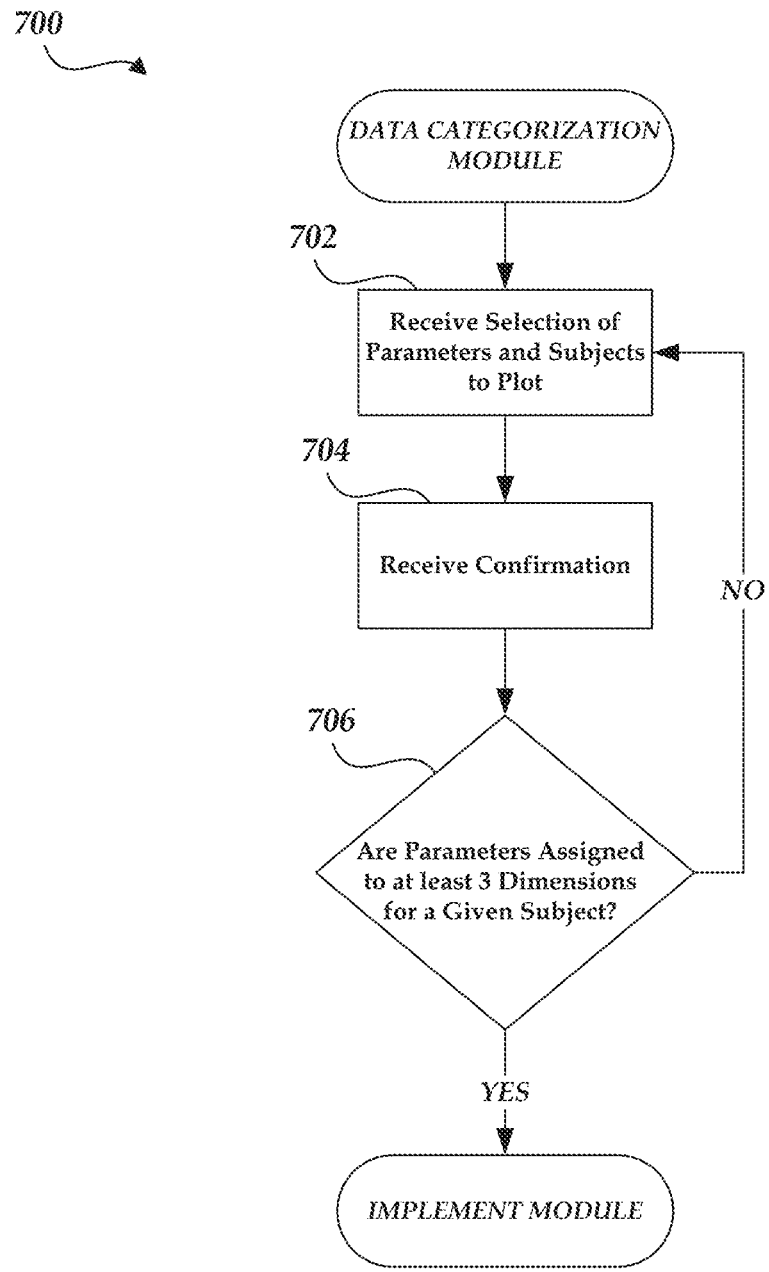

Referring to FIG. 7, process flow diagram 700 illustrates a method for data setup for use in a data visualization program. In some embodiments, process flow diagram 700 may be performed by the server computing system 130. For example, process flow diagram 700 may correspond to the setup module 210, as described with reference to FIG. 2A. At block 702, the server computing system receives one or more selections of parameters and subjects to plot. For example, the server computing system 130 can receive user inputs that select one or more subject columns and parameter columns for the subjects that were categorized in process flow diagram 600, as described with reference to FIG. 6. The selections of parameters and subjects can be associated with plotting dimensions. In a nonlimiting example, the server computing system 130 can receive a selection of nine dimensions of parameters and subjects regarding equity data. In this example, the selection can include entity column as a subject, a P/E Ratio column as an X-axis, a dividend yield column as a Y-axis, a 52 week high-low column as a Z-axis, a market cap column as a ball size, an industry segment column as a ball color, a growth vs column as ball shape, an expected result in 7 days column as an additional symbol, and a date column as a movement by time. While the above example identifies nine specific dimensions, a different number or type of dimensions may be used. For example, as few as three dimensions may be used and different dimensions such as those higher than nine dimensions may be used.

At block 704, the server computing system 130 receives a confirmation of the selection. For example, a user can complete the selection and confirm the selection by selecting a "Run" operation or other selection on a user interface. In some embodiments, the confirmation is automatically received by the server computing system 130 when all the columns have been selected.

At block 706, the server computing system 130 determines if parameters have been assigned to at least three dimensions for each selected subject. For example, the server computing system 130 can require that a parameter column be assigned to each of the X-axis, Y-axis, and Z-axis. If the determination at block 706 is negative, the process flow diagram 700 may revert back to block 702 to receive further selection. In some embodiments, when the server computing system 130 determines that parameters have not been assigned to at least three dimensions for each selected subject, the server computing system 130 notifies a user. For example, the server computing system 130 can cause a notification to appear on a user interface of a user device 102 in which at least three dimensions for each subject must be selected.

If the determination at block 706 is negative, the process flow diagram 700 may conclude. In some embodiments, the conclusion of process flow diagram 700 triggers process flow diagram 800, as described with reference to FIG. 8, to begin. For example, the selected columns of process flow diagram 700 can be loaded and used at block 802 of process flow diagram 800.

Figure 8:
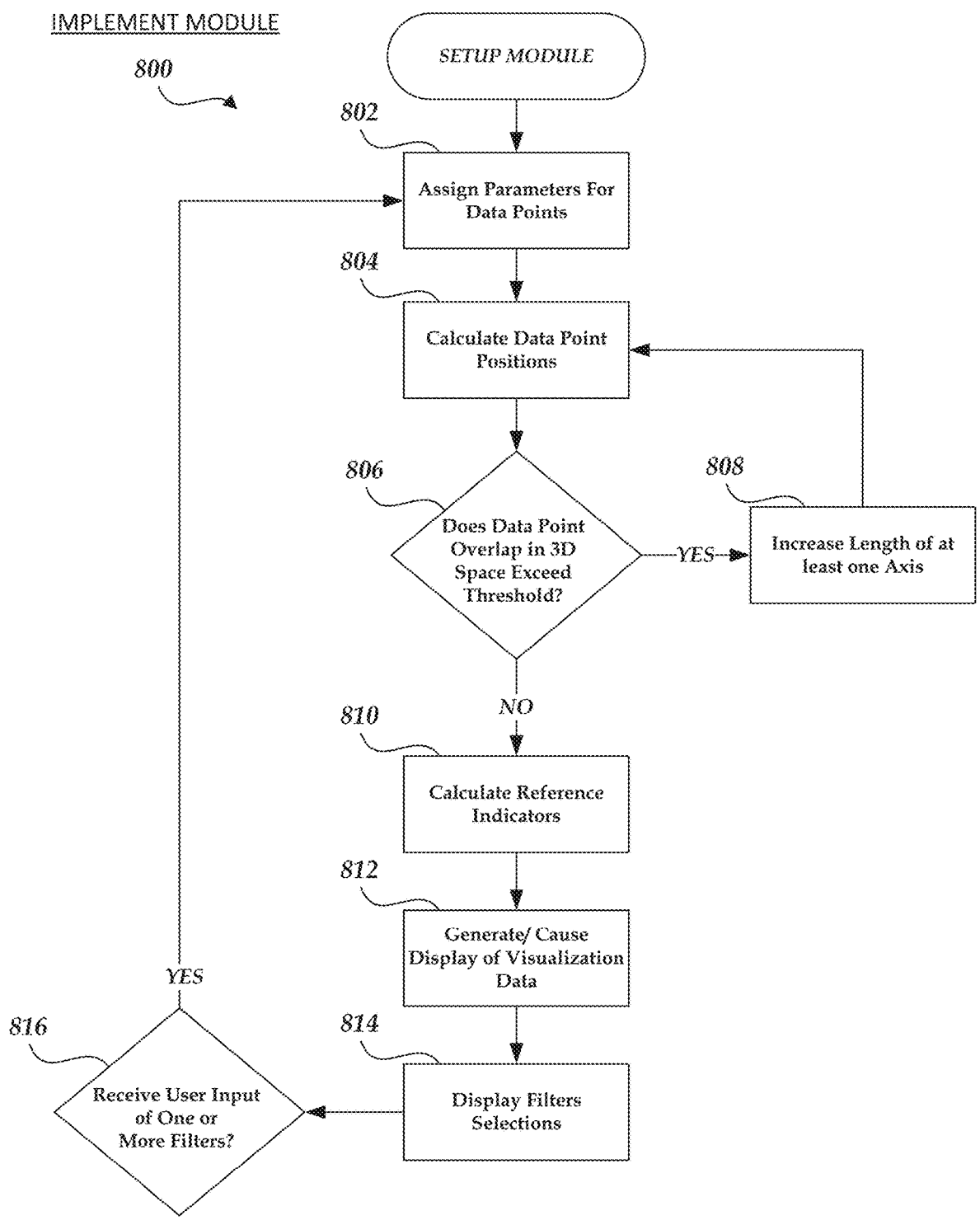

Referring to FIG. 8, process flow diagram 800 illustrates a method for data setup for use in a data visualization program. In some embodiments, process flow diagram 800 may be performed by the server computing system 130. For example, process flow diagram 800 may correspond to the implement module 212, as described with reference to FIG. 2A. At block 802, the server computing system 130 assigns parameters for each data points. For example, the server computing system 130 can assign the selected columns of process flow diagram 700, as described with reference to FIG. 7, for each data points. Each data point may correspond to individual values of selected subject columns. Parameters may be assigned to dimensions, such as subject, X-axis, Y-axis, Z-axis, ball size, ball color, ball shape, additional symbol, and movement by time. Other dimensions may also be used.

At block 804, the server computing system 130 calculates data point positions and other parameters. For each data point a position and other parameters may be calculated using the parameters associated with the data point. For example, using dimensions such as X-axis, Y-axis, Z-axis, ball size, ball shape, and movement by time, a position can be calculated for each data point and using dimensions such as ball color and additional symbol other parameters may also be calculated for each data point.

At block 806, the server computing system 130 if the data points overlap each other in three-dimensional space more than a threshold amount. Once the position is calculated for each data point, the implement module 212 can determine if any data points overlap in one or more dimensions, such as the X-axis, Y-axis, and/or Z-axis. The threshold can determine how many data points can overlap. For example, the threshold may be set at 30%, indicating a positive determination at block 806 if more than 30% of data points overlap on one or more dimensions. The above threshold (30%) is merely examples, and many other thresholds such as 35%, 40%, 50%, 60%, any other percentages therebetween, etc., can also be used. If the determination at block 806 is positive, the process flow diagram 800 may continue to block 808.

At block 808, the server computing system 130 increases length of at least one axis. The server computing system 130 may determine an axis to increase based on which axis is determined to have the most amount of overlap. For example, if the server computing system 130 determines that 40% of the data points overlaps on the X-axis, 12% of the data points overlaps on the Y-axis, and 30% overlaps on the Z-axis, the server computing system 130 can increase the X-axis to allow more space on the X-axis for the data points. Once the axis has been increased, the process flow diagram 800 continues to block 804 until the system can determine a negative result at block 806.

If the determination at block 806 is negative, the process flow diagram 800 may continue to block 810. At block 810, the server computing system 130 calculates reference indicators. The reference indicators can be calculated based on the data points. For example, the reference indicators may represent average and median values for each axis. The reference indictors may include graphical representation to be plotted on a graph. For example, the reference indictors may include reference lines and/or reference planes that intersect with one or more of the axes.

At block 812, the server computing system 130 generates and/or causes display of visualization data to plot a graph. The server computing system 130 can generate a virtual three-dimensional space and place each data point in the virtual space based on the calculated axes and the parameter values for each data point. The server computing system 130 may also place any calculated reference indicator in the virtual three-dimensional space. The server computing system 130 can cause the visualization data (e.g., the graph) to be displayed on one or more user devices, such as user device(s) 102. For example, the graph can correspond to the graphical user interfaces as described with reference to FIGS. 3A-3C.

At block 814, the server computing system 130 displays filter selections. The filter selections can be one or more filters configured to add and/or remove data points or modify the graph in some way during runtime. For example, the filters can alter displayed parameters, alter minimum/maximum parameter values, remove flagged outliers, alter color/shape of datapoints, etc. The server computing system 130 can cause the filters to be displayed on a graphical user interface, such as user device(s) 102. For example, the filters can correspond to filter pane 382, as described with reference to FIGS. 3A-3C. In some embodiments, the filters are included in the visualization data generated at block 812.

At block 816, the server computing system 130 determines if the server computing system 130 receives user input of one or more filters. For example, the server computing system 130 can cause the graph to maintain a configuration on the graphical user interface unless a filter is selected. If the server computing system 130 determines that a filter is selected, the process flow diagram 800 can continue to block 802 so the graph can be reconfigured with the filter applied to the data points.

ADDITIONAL CONSIDERATIONS

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

As is also stated above, it should be noted that the use of particular terminology when describing certain features or aspects should not be taken to imply that the terminology is being re-defined herein to be restricted to including any specific characteristics of the features or aspects of the technology with which that terminology is associated. Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The phrase "based on" does not mean "based only on," unless expressly specified otherwise. In other words, the phrase "based on" describes both "based only on" and "based at least on." Unless otherwise explicitly stated, articles such as "a" or "an" should generally be interpreted to include one or more described items. Accordingly, phrases such as "a device configured to" are intended to include one or more recited devices.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description also discloses methods and materials of the present application. The devices described herein may be susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A computer-implemented method for generating and presenting a graphical user interface, the computer-implemented method comprising:
   importing, at a processor, one or more data inputs from one or more databases;
   determining, at the processor, that the one or more data inputs comprise at least one subject column and at least three parameter columns;
   determining, at the processor, whether a first data input and a second data input of the one or more data inputs comprise a common key;
   in response to determining the first data input and the second data input comprise the common key, joining, at the processor, the first data input and the second data input;
   determining, at the processor, whether one or more values of the one or more data inputs are missing;
   in response to determining the one or more values are missing, generating, at the processor, fill values for each missing value;
   categorizing, at the processor, each column of the one or more data inputs into subject columns and parameter columns;
   in response to categorizing a first column into a parameter column, categorizing, at the processor, the first column into a parameter type;
   receiving, at the processor, one or more user inputs configured to select at least one subject column and at least three parameter columns to be assigned to at least three plot dimensions;
   determining, at the processor, a plurality of data point positions based at least in part on the one subject column and the three parameter columns, each of the plurality of data point positions associated with a data point of a plurality of data points;

determining, at the processor, one or more additional dimensional attributes for each data point of the plurality of data points based at least in part on additional selected parameter columns, wherein the one or more additional dimensional attributes comprise a ball size dimension defining a ball size of the data point in each of the at least three plot dimensions;

in response to determining the plurality of data point positions and determining one or more additional dimensional attributes for each data point, determining, at the processor, whether the plurality of data points overlap each other in more than a threshold amount along at least a first plot dimension of the at least three plot dimensions based on at least the plurality of data point positions and the ball size of each data point of the plurality of data points;

adjusting, at the processor, a length of at least the first plot dimension and redetermining, at the processor, the plurality of data point positions;

determining, at the processor, one or more reference indicators based at least in part on the plurality of data point positions;

generating, at the processor, a graphical user interface comprising:
 a graph with at least three plot axes corresponding to the at least three plot dimensions,
 a control pane configured to adjust a view of the graph, the control pane comprising a navigate selections portion, and
 a filter pane;

displaying, at the processor, each data point of the plurality of data points on the graph of the graphical user interface based at least in part on the plurality of data point positions, the one or more additional dimensional attributes, and the one or more reference indicators;

receiving one or more second user inputs via the navigate selections portion of the control pane;

adjusting, based on the one or more second user inputs, an angle of a perspective view of the at least three plot axes on the graphical user interface;

receiving one or more third user inputs via the filter pane;

determining one or more data points to filter from the graphical user interface based on the one or more third user inputs;

removing the one or more data points from the plurality of data points;

redetermining, at the processor, the plurality of data point positions;

redetermining, at the processor, the one or more additional dimensional attributes for each data point of the plurality of data points based at least in part on additional selected parameter columns;

in response to redetermining the plurality of data point positions and redetermining one or more additional dimensional attributes for each data point, redetermining, at the processor, whether the plurality of data points overlap each other in more than the threshold amount along at least the first plot dimension of the at least three plot dimensions based on at least the plurality of data point positions and the ball size of each data point of the plurality of data points;

readjusting, at the processor, the length of at least the first plot dimension; and displaying, at the processor, each data point of the plurality of data points on the graph of the graphical user interface based at least in part on the redetermined plurality of data point positions, the redetermined one or more additional dimensional attributes, and the readjusted length of at least the first plot.

2. The computer-implemented method of claim 1, wherein the common key comprises a common subject, and wherein determining whether the first data input and the second data input comprise the common key comprises determining whether the first data input and the second data input each comprise a column of data associated with the common subject.

3. The computer-implemented method of claim 1, wherein joining the first data input and the second data input comprises performing structured query language join statements between the first data input and the second data input.

4. The computer-implemented method of claim 1, wherein determining whether the one or more values are missing comprises determining whether a first column does not have a data value that corresponds to a subject value of the at least one subject column.

5. The computer-implemented method of claim 1, wherein generating the fill values for each missing value comprises at least one of:
 entering a default value into each missing value;
 entering a median value of a column of data associated with each missing value; or
 entering an average value of the column of data associated with each missing value.

6. The computer-implemented method of claim 1, wherein the subject columns comprise data values identifying the plurality of data points, and wherein the parameter columns comprise data values associated with the plurality of data point positions and the one or more additional dimensional attributes for each data point.

7. The computer-implemented method of claim 1, wherein categorizing the first column into the parameter type comprises determining that the first column comprises one of ordinal data, nominal data, discrete data, continuous data, date data, or snapshot data.

8. The computer-implemented method of claim 1, further comprising:
 determining, at the processor, one or more relative axis dimensions based at least in part on one or more determined parameter types;
 wherein each of the relative axis dimensions comprises a range of values and outlier defining values, and wherein the outlier defining values identify one or more outlier values from the range of values.

9. The computer-implemented method of claim 1, wherein the one or more additional dimensional attributes further comprise at least one of a ball color dimension, a ball shape dimensions, an additional symbol dimension, or a time dimensions.

10. The computer-implemented method of claim 1, wherein determining whether the plurality of data points overlap each other in more than a threshold amount along at least a first plot dimension of the at least three plot dimensions comprises:
 determining a number of data point overlaps, wherein a data point overlap comprises two data points that intersect on at least the first plot dimension; and
 determining the number of data point overlaps exceeds the threshold amount.

11. A system for generating and presenting a graphical user interface, the system comprising:
 one or more processors; and
 one or more non-transitory computer-readable media storing instructions which, when executed by the one or more processors, cause the one or more processors to:

import one or more data inputs from one or more databases;
determine that the one or more data inputs comprise at least one subject column and at least three parameter columns;
determine whether a first data input and a second data input of the one or more data inputs comprise a common key;
in response to determining the first data input and the second data input comprise the common key, join the first data input and the second data input;
determine whether one or more values of the one or more data inputs are missing;
in response to determining the one or more values are missing, generate fill values for each missing value;
categorize each column of the one or more data inputs into subject columns and parameter columns;
in response to categorizing a first column into a parameter column, categorize the first column into a parameter type;
receive one or more user inputs configured to select at least one subject column and at least three parameter columns to be assigned to at least three plot dimensions;
determine a plurality of data point positions based at least in part on the one subject column and the three parameter columns, each of the plurality of data point positions associated with a data point of a plurality of data points;
determine one or more additional dimensional attributes for each data point of the plurality of data points based at least in part on additional selected parameter columns, wherein the one or more additional dimensional attributes comprise a ball size dimension defining a ball size of the data point in each of the at least three plot dimensions;
in response to determining the plurality of data point positions and determining one or more additional dimensional attributes for each data point, determine whether the plurality of data points overlap each other in more than a threshold amount along at least a first plot dimension of the at least three plot dimensions based on at least the plurality of data point positions and the ball size of each data point of the plurality of data points;
adjust a length of at least the first plot dimension and redetermine the plurality of data point positions;
determine one or more reference indicators based at least in part on the plurality of data point positions;
generate a graphical user interface comprising:
 a graph with at least three plot axes corresponding to the at least three plot dimensions,
 a control pane configured to adjust a view of the graph, the control pane comprising a navigate selections portion, and
 a filter pane;
display each data point of the plurality of data points on the graph of the graphical user interface based at least in part on the plurality of data point positions, the one or more additional dimensional attributes, and the one or more reference indicators;
receive one or more second user inputs via the navigate selections portion of the control pane;
adjust, based on the one or more second user inputs, an angle of a perspective view of the at least three plot axes on the graphical user interface;
receive one or more third user inputs via the filter pane;
determine one or more data points to filter from the graphical user interface based on the one or more third user inputs;
remove the one or more data points from the plurality of data points;
redetermine the plurality of data point positions;
redetermine the one or more additional dimensional attributes for each data point of the plurality of data points based at least in part on additional selected parameter columns;
in response to redetermining the plurality of data point positions and redetermining one or more additional dimensional attributes for each data point, redetermine whether the plurality of data points overlap each other in more than the threshold amount along at least the first plot dimension of the at least three plot dimensions based on at least the plurality of data point positions and the ball size of each data point of the plurality of data points;
readjust the length of at least the first plot dimension; and
display each data point of the plurality of data points on the graph of the graphical user interface based at least in part on the redetermined plurality of data point positions, the redetermined one or more additional dimensional attributes, and the readjusted length of at least the first plot.

12. The system of claim 11, wherein the common key comprises a common subject, and wherein to determine whether the first data input and the second data input comprise the common key, the instructions cause the one or more processors to determine whether the first data input and the second data input each comprise a column of data associated with the common subject.

13. The system of claim 11, wherein to join the first data input and the second data input, the instructions cause the one or more processors to perform structured query language join statements between the first data input and the second data input.

14. The system of claim 11, wherein to determine whether the one or more values are missing, the instructions cause the one or more processors to determine whether a first column does not have a data value that corresponds to a subject value of the at least one subject column.

15. The system of claim 11, wherein to generate the fill values for each missing value, the instructions cause the one or more processors to at least one of:
 enter a default value into each missing value;
 enter a median value of a column of data associated with each missing value; or
 enter an average value of the column of data associated with each missing value.

16. The system of claim 11, wherein the subject columns comprise data values identifying the plurality of data points, and wherein the parameter columns comprise data values associated with the plurality of data point positions and the one or more additional dimensional attributes for each data point.

17. The system of claim 11, wherein to categorize the first column into the parameter type, the instructions cause the one or more processors to determine that the first column comprises one of ordinal data, nominal data, discrete data, continuous data, date data, or snapshot data.

18. The system of claim 11, wherein the one or more additional dimensional attributes further comprise at least one of a ball color dimension, a ball shape dimensions, an additional symbol dimension, or a time dimensions.

19. The system of claim 11, wherein to determine whether the plurality of data points overlap each other in more than a threshold amount along at least a first plot dimension of the at least three plot dimensions, the instructions cause the one or more processors to:
   determine a number of data point overlaps, wherein a data point overlap comprises two data points that intersect on at least the first plot dimension; and
   determine the number of data point overlaps exceeds the threshold amount.

20. A non-transitory computer readable recording medium for storing instructions, when executed by one or more processors, configured to perform the method of claim 1.

21. The computer-implemented method of claim 1, wherein the control pane further comprises a two dimensional selection portion, and wherein the computer-implemented method further comprises:
   projecting, based on the one or more second user inputs one or more of the at least three plot dimensions onto two plot axes of the at least three plot axes.

\* \* \* \* \*